United States Patent
Cromie et al.

(10) Patent No.: US 11,623,723 B2
(45) Date of Patent: Apr. 11, 2023

(54) PROPELLER BLADE ASSEMBLY

(71) Applicant: Aerostar International, LLC, Columbia, MD (US)

(72) Inventors: John Cromie, Menlo Park, CA (US); Carey Hijmans, Morgan Hill, CA (US)

(73) Assignee: Aerostar International, LLC, Columbia, MD (US)

( * ) Notice: Subject to any disclaimer, the term of this patent is extended or adjusted under 35 U.S.C. 154(b) by 167 days.

(21) Appl. No.: 17/022,336

(22) Filed: Sep. 16, 2020

(65) Prior Publication Data

US 2022/0081098 A1     Mar. 17, 2022

(51) Int. Cl.
*F01D 5/02*        (2006.01)
*F01D 5/14*        (2006.01)
(Continued)

(52) U.S. Cl.
CPC ............... *B64B 1/58* (2013.01); *B64D 27/02* (2013.01); *F01D 5/02* (2013.01); *F01D 5/147* (2013.01); *F01D 5/282* (2013.01); *F01D 5/30* (2013.01)

(58) Field of Classification Search
CPC ............ B29L 2031/08; B29L 2031/087; F05B 2280/60; F05B 2240/301; F05B 2280/6013; F05B 2220/30; F05B 2280/702; F05B 2230/31; F05D 2240/301; B21D 53/78; F01D 5/147; F01D 5/282; F01D 5/02; F01D 5/30; B64B 1/30; B64B 1/58; B64B 1/44; B64B 1/40; B64C 11/08; B64C 11/26;
(Continued)

(56) References Cited

U.S. PATENT DOCUMENTS 2,643,725 A    6/1953   Heath
2,647,586 A    8/1953   Gruetjen
(Continued)

OTHER PUBLICATIONS

Ilieva, Galina, et al., A critical review of propulsion concepts for modern airships, Central European Journal of Engineering, Cent. Eur. J. Eng. • 2(2) • 2012 • 189-200, DOI: 10.2478/s13531-011-0070-1.

(Continued)

*Primary Examiner* — Eric J Zamora Alvarez
(74) *Attorney, Agent, or Firm* — Kim and Lahey Law Firm, LLC; Seann P. Lahey

(57) ABSTRACT

Aspects of the technology relate to a propeller blade assembly that is used in lateral propulsion systems for lighter-than-air high altitude platforms designed to operate, e.g., in the stratosphere. During operation, the propeller of the assembly is pointed along a specified heading and rotates at a selected velocity (e.g., hundreds or thousands of revolutions per minute). Power is supplied to the propeller as needed during lateral propulsion to move the platform along a particular trajectory or to remain on station over a given geographic location. In certain circumstances, the propeller may become damaged. This can include one or more blades breaking or shattering, which can result in failure of the propeller and potentially the entire LTA platform. The technology provides blades that are sufficiently flexible to avoid breakage or shattering due to debris impact or envelope entanglement, or otherwise shed a load. This can avoid catastrophic failure during stratospheric operation.

19 Claims, 24 Drawing Sheets

(51) Int. Cl.
*F01D 5/28* (2006.01)
*F01D 5/30* (2006.01)
*B64B 1/58* (2006.01)
*B64D 27/02* (2006.01)

(58) Field of Classification Search
CPC ..... B64D 27/02; F03D 1/0675; F03D 1/0633; F03D 1/065; F03D 3/062
See application file for complete search history.

(56) References Cited

U.S. PATENT DOCUMENTS

| | | | | |
|---|---|---|---|---|
| 4,995,572 | A * | 2/1991 | Piasecki | B64C 37/02 244/33 |
| 5,392,514 | A * | 2/1995 | Cook | B29D 99/0028 29/889.7 |
| 5,520,515 | A * | 5/1996 | Bailey | F04D 29/36 416/214 R |
| 8,043,067 | B2 * | 10/2011 | Kuroiwa | F03D 1/0675 416/223 R |
| 9,410,434 | B2 | 8/2016 | Peiellaz | |
| 9,816,482 | B2 * | 11/2017 | Caruso | F03D 1/0633 |
| 10,487,797 | B2 * | 11/2019 | Hancock | F03D 1/0675 |
| 2007/0251090 | A1 * | 11/2007 | Breugel | B32B 27/04 29/889.7 |
| 2011/0171038 | A1 * | 7/2011 | Esaki | F03D 1/0675 156/213 |
| 2018/0347541 | A1 * | 12/2018 | Kudsk | B33Y 80/00 |

OTHER PUBLICATIONS

Jamison, Lewis, et al., High-Altitude Airships for the Future Force Army, Arroyo Center, The Rand Corporation, 2005, pp. 1-76.
Koch, L. Danielle, Design and Performance Calculations of a Propeller for Very High Altitude Flight, NASA/TM-1998, Lewis Research Center, pp. 1-131, Feb. 1998.
Romeo, G., et al., Design of a high-altitude long-endurance solar-powered unmanned air vehicle for multi-payload and operations, Proc. IMechE vol. 221 Part G: J. Aerospace Engineering, pp. 199-216, 2007.
Selig, Michael S., et al., High-Lift Low Reynolds Number Airfoil Design, Journal of Aircraft vol. 34, No. 1, Jan.-Feb. 1997, pp. 72-79.

* cited by examiner

400

500

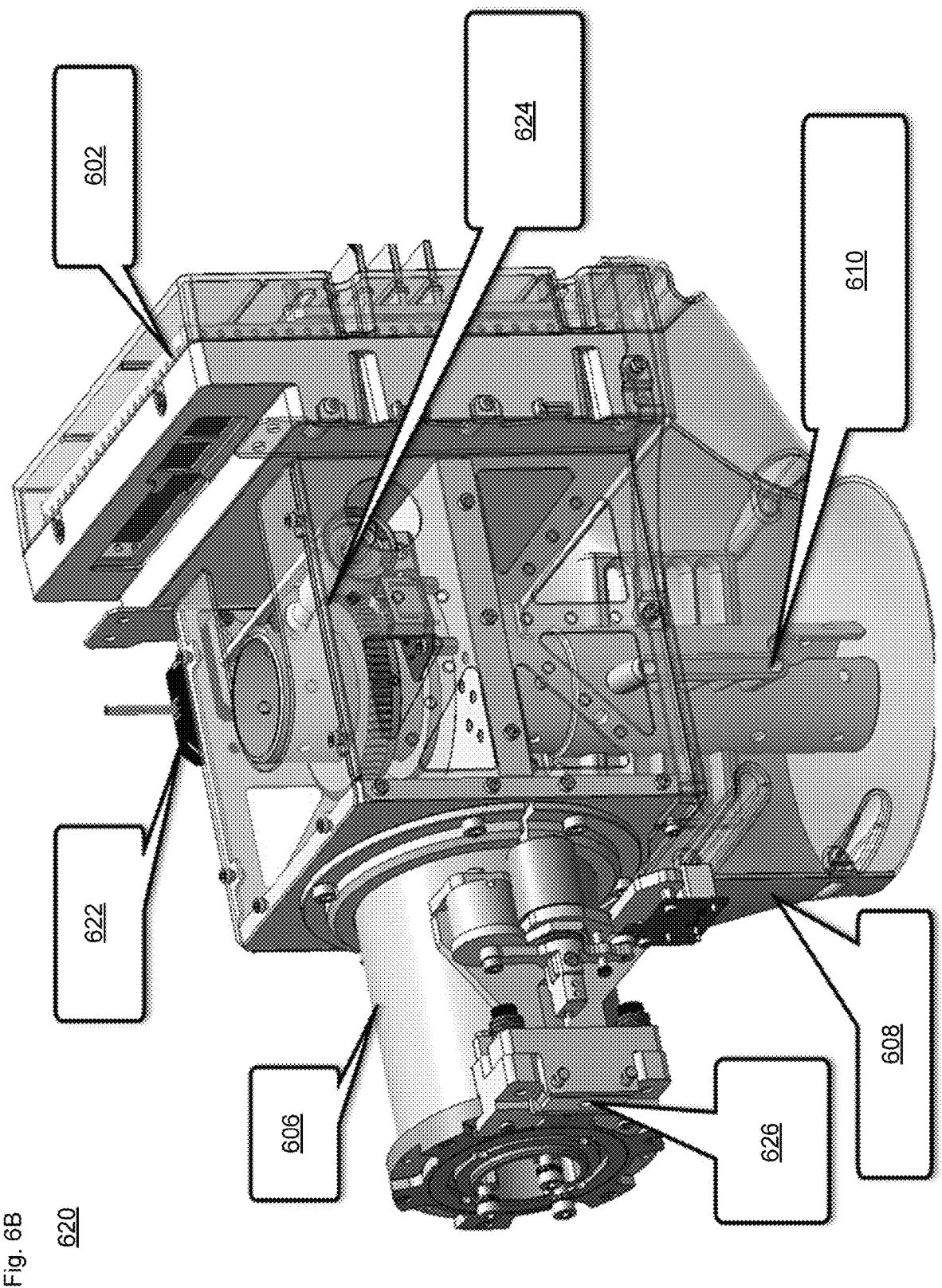

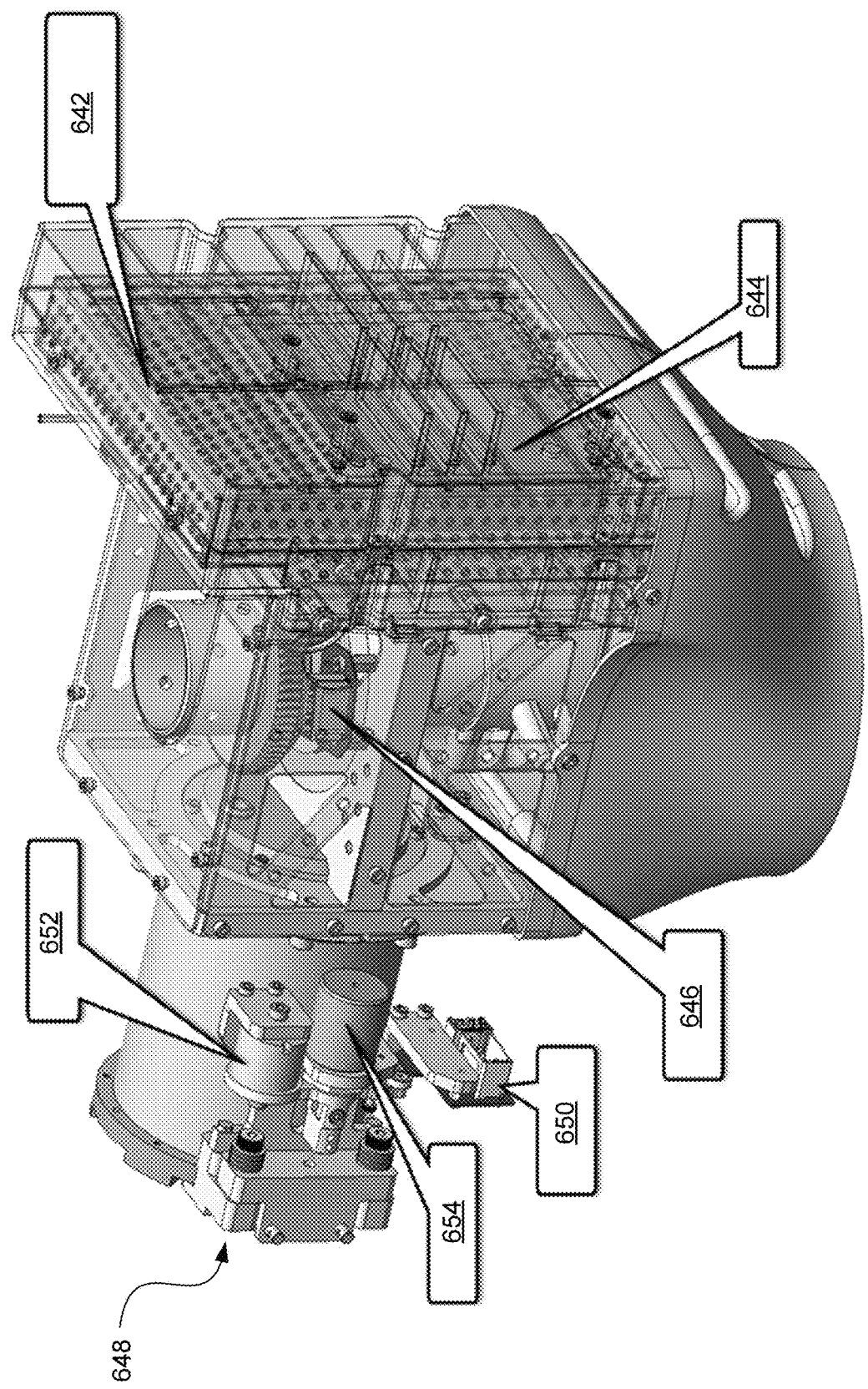

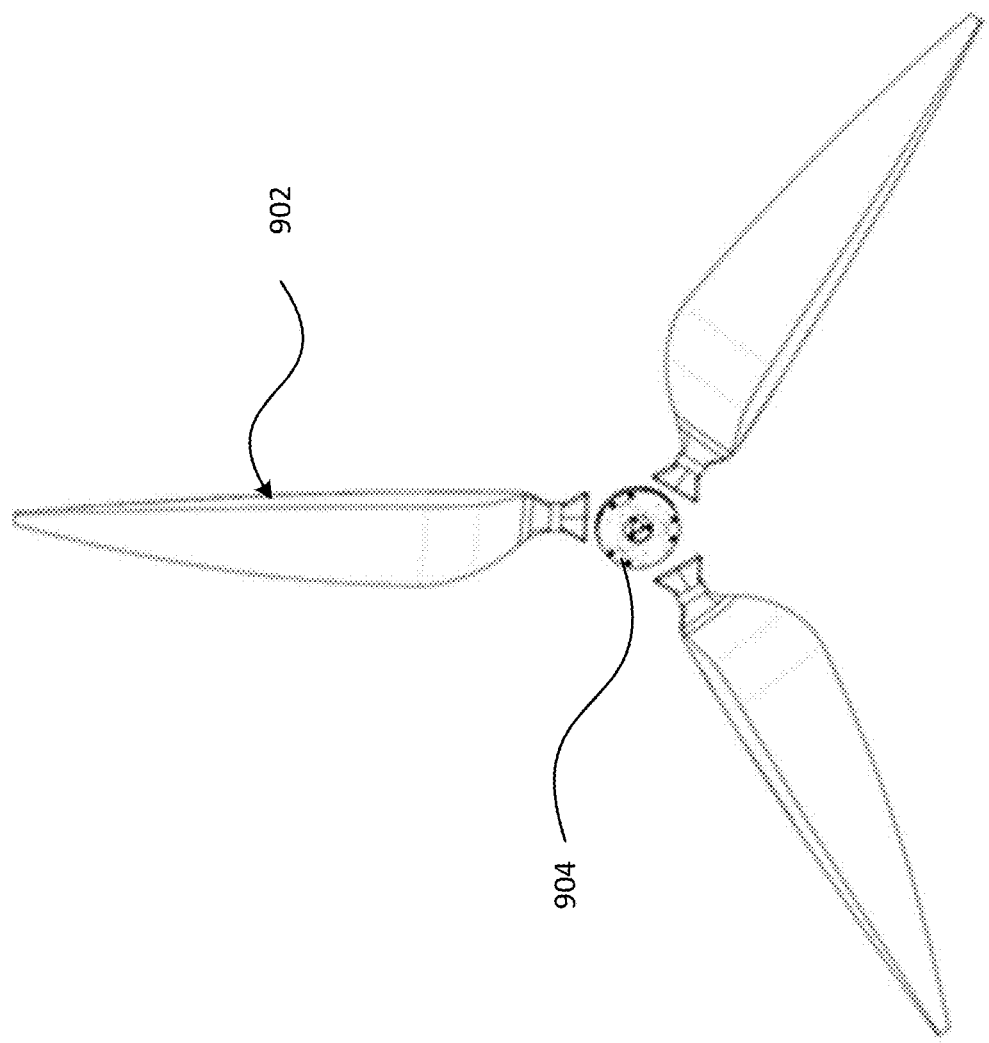

1110

1130

1100

1120

1210

1230

1200

1220

1480

A-A

SECTION A-A

1520

1510

1500

1530

PROPELLER BLADE ASSEMBLY

BACKGROUND

Telecommunications connectivity via the Internet, cellular data networks and other systems is available in many parts of the world. However, there are locations where such connectivity is unavailable, unreliable or subject to outages from natural disasters. Some systems may provide network access to remote locations or to locations with limited networking infrastructure via satellites or high altitude platforms. In the latter case, due to environmental conditions and other limitations, it is challenging to keep the platforms aloft and operational over a desired service area for long durations, such as weeks, months or more. Platforms may use propellers to remain aloft or to navigate to a particular service area. However, damage to a propeller, for instance due to debris impact or entanglement with an object, can cause failures that may render a platform inoperable.

SUMMARY

Aspects of the technology relate to a high altitude platform (HAP) that is able to remain on station or move in a particular direction toward a desired location, for instance to provide telecommunication services. The HAP may be a lighter-than-air (LTA) platform such as a balloon configured to operate in the stratosphere. The LTA platform may include an envelope filled with lift gas and a payload for providing telecommunication services, with a connection member coupling the payload with the envelope. A lateral propulsion system provides directional thrust for moving the platform towards a destination or to remain on station. This can include using a propeller assembly of the lateral propulsion system to move the platform along a certain heading. By way of example, the propeller assembly may be able to rotate up to 360° or more around the connection member in order to adjust the platform's heading.

During operation, the propeller is pointed along a specified heading and rotates at a particular velocity (e.g., hundreds or thousands of revolutions per minute). Power is supplied to the propeller as needed during lateral propulsion. When lateral propulsion is not needed, power is no longer supplied to the propeller and it may slowly cease rotating. However, in certain circumstances such as a catastrophic envelope failure when a portion of the envelope becomes entangled with the propeller blades or debris impacts one or more blades, the propeller may become damaged. This can include one or more blades breaking or shattering, which can result in failure of the propeller and potentially the entire LTA platform. The technology provides a propeller assembly having blades that are sufficiently flexible to avoid breakage or shattering due to debris impact or envelope entanglement, while being able to provide sufficient thrust for operation of the LTA platform in the stratosphere.

According to one aspect of the technology, a propeller blade assembly for use with a lighter-than-air craft for operation in the stratosphere is provided. The propeller blade assembly comprises a hub assembly having a central opening configured to receive a rotatable shaft of a propeller motor assembly of the lighter-than-air craft, and a plurality of propeller blades. Each blade of the plurality has a root structure at a first end and a tip at a second end opposite the root structure. The root structure is secured to the hub assembly. Each respective blade includes a core extending between the root structure and the tip, with the core having a first side and a second side opposite the first side. Each blade also includes a first spar cap disposed along the first side of the core, a second spar cap disposed along the second side of the core, and at least one reinforcement ply disposed between the root structure and the tip. The at least one reinforcement ply is arranged between either the core and the first spar cap or the core and the second spar cap. The at least one reinforcement ply is configured to prevent a blade fragment from separating from the respective blade. Each blade also includes a pair of outer layers. A first one of the outer layers overlies the first spar cap, and a second one of the outer layers overlies the second spar cap.

In one example, the at least one reinforcement ply is a pair of reinforcement plies, a first one of the pair of reinforcement plies is disposed between the core and the first spar cap, and a second one of the pair of reinforcement plies is disposed between the core and the second spar cap.

In one scenario, the at least one reinforcement ply is an aramid layer. Here, the aramid layer may extend from the first end to the second end of the respective blade. The aramid layer may comprise a set of aramid strips. In this case, the set of aramid strips may be arranged along a different part of the respective blade. Each strip of the set of aramid strips may be between 0.5-2.0 inches wide. The aramid layer may alternatively be a continuous sheet arranged to cover at least 60% of the surface area of one side of the respective blade.

In another example, the core tapers from a first end adjacent the root structure to a second end adjacent the tip of the respective blade. The core may comprise a polystyrene foam. Alternatively or additionally, the at least one reinforcement ply may be aligned longitudinally along the respective blade with the core and either the first spar cap or the second spar cap.

Each of the first spar cap and the second spar cap may comprise a series of plies arranged in layers of increasing length with an outermost layer being longer than an innermost layer. In this case, the series of plies may be formed of carbon fabric.

Each blade may be configured to survive a load of at least 8 kg without permanently deforming. Each blade may be configured to survive a dynamic pressure during descent on the order of 250 Pascals. The propeller blade assembly may be configured to shed a load of at least 1000 newtons. Each blade may be configured so that no blade fragment can separate from that blade when impacted by an object having a mass of less than 5 kg at an impact velocity of less than 10 m/s. Alternatively or additionally, the propeller blade assembly may be configured so that no part thereof separates from the assembly upon entanglement with a portion of the lighter-than-air craft at a force of below 5500 newtons.

According to another aspect of the technology, a lighter-than-air craft is configured for operation in the stratosphere. The lighter-than-air craft comprises an envelope configured to inflate with lift gas, a payload including one or more communication modules which is attached to the envelope, and a propulsion system configured to provide lateral propulsion to the lighter-than-air craft. The propulsion system includes a propeller blade assembly in any of the configurations described above. For instance, in one example the at least one reinforcement ply is an aramid layer, which may comprise a set of aramid strips.

BRIEF DESCRIPTION OF THE DRAWINGS

FIGS. 6A-C illustrate a control assembly in accordance with aspects of the technology.

FIGS. 9A-E illustrate a propeller blade assembly in accordance with aspects of the technology.

DETAILED DESCRIPTION

Overview

Figure 1:
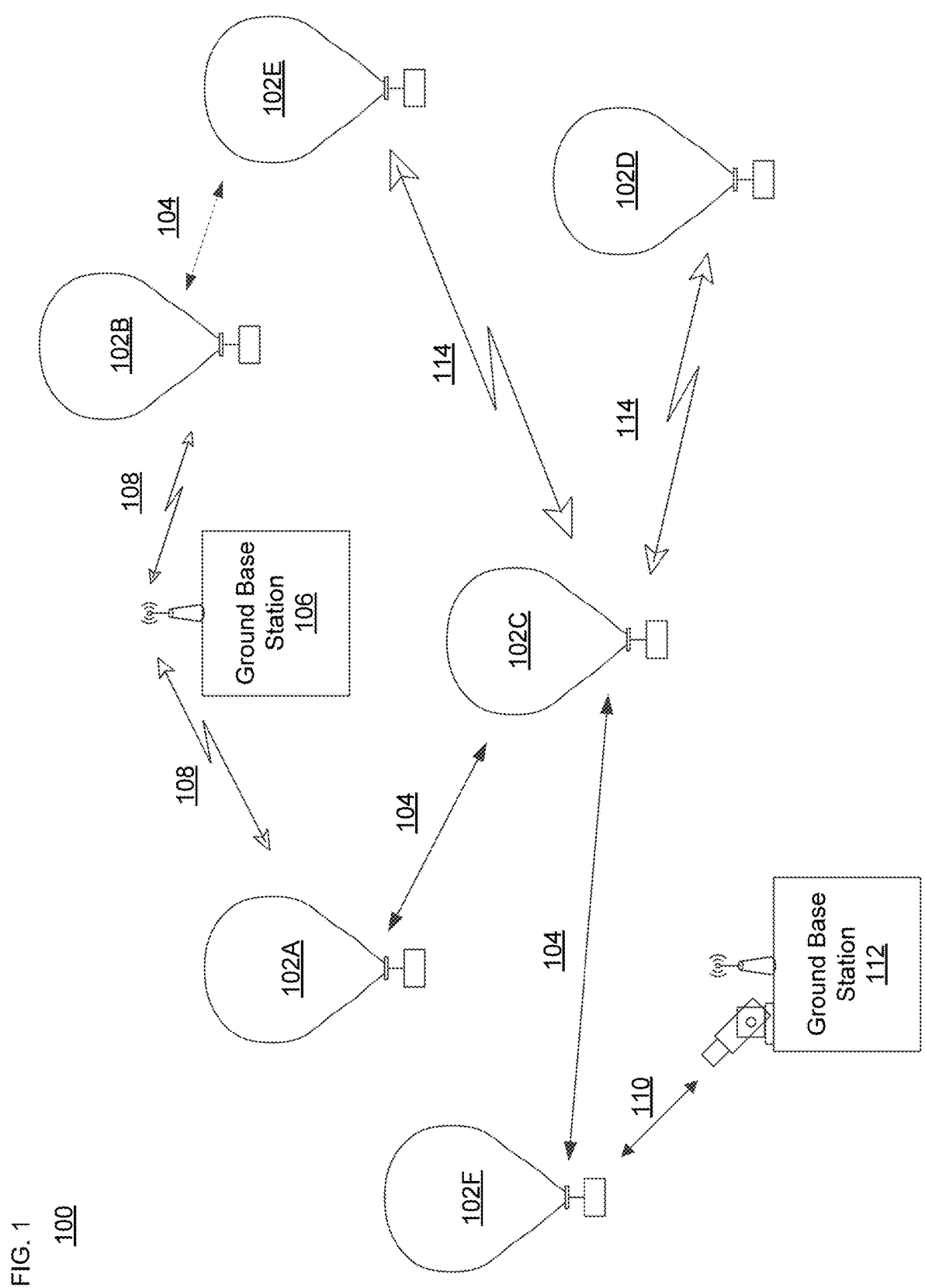
FIG. 1 is a functional diagram of an example system in accordance with aspects of the disclosure.

The technology relates to a propeller blade assembly, such as may be used in lateral propulsion systems for LTA-type HAPs designed to operate, e.g., in the stratosphere. Stratospheric HAP platforms, such as high altitude balloons and other LTA craft, may have a float altitude of between about 50,000-120,000 feet above sea level. The ambient temperature may be on the order of −10° C. to −90° C. or colder, and the air pressure may range between 100-1 millibars, depending on the altitude and weather conditions. These and other environmental factors in the stratosphere can be challenging for lateral propulsion systems.

Under typical operating conditions, the propeller blade assembly may only be powered for a certain period of time. When the power is turned off, the propeller blade assembly will slow down and eventually stop. However, in certain emergent situations it may be necessary to immediately cause the propeller assembly to stop rotating, such as during descent of the LTA platform.

As explained below, an example lateral propulsion system may employ a propeller blade assembly to provide directional adjustments to the HAP, for instance to counteract movement due to the wind, or to otherwise cause the HAP to move along a selected heading or remain over a given location. Such adjustments can enhance operation across a fleet of HAPs. For instance, by employing a small amount of lateral propulsion at particular times (e.g., speed on the order of 0.5-2.0 m/s), a given platform may remain on station over a desired service area for a longer period than without such propulsion, or change direction to move towards a particular destination. The platform may also be able to return to the desired service area more quickly using lateral propulsion to compensate against undesired wind effects. Applying this approach for some or all of the platforms in the fleet may mean that the total number of platforms necessary to provide a given level of service (e.g., telecommunications coverage for a service area) may be significantly reduced as compared to a fleet that does not employ lateral propulsion.

One or more motors can be used to actuate a lateral propulsion system of the HAP to effect the directional changes. This can include a pointing axis motor for rotating the lateral propulsion system to a particular heading, and a drive motor for causing a propeller assembly or other propulsion mechanism to turn on and off. In one example, a controller of the lateral propulsion system is configured to cause the pointing axis motor to rotate the propeller assembly about a connection member of the HAP by up to 360° or more. The drive motor may be actuated to provide a selected amount of propulsion, which may be based on blade size, rigidity and other aspects of the propeller blade assembly, as well as the speed of rotation. Depending on the mode of operation, the propeller blade assembly may rotate at speeds in excess of 2500 rpm in the stratosphere. A braking system may be used to actively cause the assembly to stop rotating, without damaging the propeller assembly. This can be particularly beneficial in situations such as a rapid or uncontrolled descent, for instance to avoid entanglement with a parachute or other parts of the platform.

In order to minimize the likelihood of a propeller blade breaking or shattering, or to shed a load, the assembly is designed to meet certain pressure and weight requirements as well as to withstand certain kinds of impacts. This can avoid catastrophic failure due to entanglement with the balloon envelope or a parachute, or impact with another part of the LTA platform.

EXAMPLE BALLOON SYSTEMS

FIG. 1 depicts an example system 100 in which a fleet of high altitude platforms, such as LTA HAPs, may be used. This example should not be considered as limiting the scope of the disclosure or usefulness of the features described herein. System 100 may be considered a network of LTA platforms such as balloons. In this example, balloon network 100 includes a plurality of devices, such as balloons 102A-F as well as ground-base stations 106 and 112. Balloon network 100 may also include a plurality of additional devices, such as various computing devices (not shown) as discussed in more detail below or other systems that may participate in the network.

The devices in system 100 are configured to communicate with one another. As an example, the balloons may include communication links 104 and/or 114 in order to facilitate intra-balloon communications. By way of example, links 114 may employ radio frequency (RF) signals (e.g., millimeter wave transmissions) while links 104 employ free-space optical transmission. Alternatively, all links may be RF, optical, or a hybrid that employs both RF and optical transmission. In this way balloons 102A-F may collectively function as a mesh network for data communications. At least some of the balloons may be configured for communications with ground-based stations 106 and 112 via respective links 108 and 110, which may be RF and/or optical links.

In one scenario, a given balloon 102 may be configured to transmit an optical signal via an optical link 104. Here, the given balloon 102 may use one or more high-power light-emitting diodes (LEDs) to transmit an optical signal. Alternatively, some or all of the balloons 102 may include laser systems for free-space optical communications over the optical links 104. Other types of free-space communication are possible. Further, in order to receive an optical signal from another balloon via an optical link 104, the balloon may include one or more optical receivers.

The balloons may also utilize one or more of various RF air-interface protocols for communication with ground-based stations via respective communication links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, 5G and/or one or more proprietary protocols developed for long distance communication, among other possibilities.

In some examples, the links may not provide a desired link capacity for balloon-to-ground communications. For instance, increased capacity may be desirable to provide backhaul links from a ground-based gateway. Accordingly, an example network may also include downlink balloons, which could provide a high-capacity air-ground link between the various balloons of the network and the ground-base stations. For example, in balloon network 100, balloon 102F may be configured as a downlink balloon that directly communicates with station 112.

Like other balloons in network 100, downlink balloon 102F may be operable for communication (e.g., RF or optical) with one or more other balloons via link(s) 104. Downlink balloon 102F may also be configured for free-space optical communication with ground-based station 112 via an optical link 110. Optical link 110 may therefore serve as a high-capacity link (as compared to an RF link 108) between the balloon network 100 and the ground-based station 112. Downlink balloon 102F may additionally be operable for RF communication with ground-based stations 106. In other cases, downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

A downlink balloon may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of balloons 102A-F could be configured to establish a communication link with space-based satellites and/or other types of high altitude platforms (e.g., drones, airplanes, airships, etc.) in addition to, or as an alternative to, a ground based communication link. In some embodiments, a balloon may communicate with a satellite or a high altitude platform via an optical or RF link. However, other types of communication arrangements are possible.

As noted above, the balloons 102A-F may collectively function as a mesh network. More specifically, since balloons 102A-F may communicate with one another using free-space optical links, the balloons may collectively function as a free-space optical mesh network. In a mesh-network configuration, each balloon may function as a node of the mesh network, which is operable to receive data directed to it and to route data to other balloons. As such, data may be routed from a source balloon to a destination balloon by determining an appropriate sequence of links between the source balloon and the destination balloon.

The network topology may change as the balloons move relative to one another and/or relative to the ground. Accordingly, the balloon network 100 may apply a mesh protocol to update the state of the network as the topology of the network changes. For example, to address the mobility of the balloons 102A to 102F, the balloon network 100 may employ and/or adapt various techniques that are employed in mobile ad hoc networks (MANETs). Other examples are possible as well.

Balloon network 100 may also implement station-keeping functions using winds and altitude control and/or lateral propulsion to help provide a desired network topology. For example, station-keeping may involve some or all of balloons 102A-F maintaining and/or moving into a certain position relative to one or more other balloons in the network (and possibly in a certain position relative to a ground-based station or service area). As part of this process, each balloon may implement station-keeping functions to determine its desired positioning within the desired topology, and if necessary, to determine how to move to and/or maintain the desired position. Alternatively, the platforms may be moved without regard to the position of their neighbors, for instance to enhance or otherwise adjust communication coverage at a particular geographic location.

The desired topology may thus vary depending upon the particular implementation and whether or not the LTA platforms are continuously moving. In some cases, the platforms may implement station-keeping to provide a substantially uniform topology where the platforms function to position themselves at substantially the same distance (or within a certain range of distances) from adjacent platforms in the network 100. Alternatively, the network 100 may have a non-uniform topology where platforms are distributed more or less densely in certain areas, for various reasons. As an example, to help meet the higher bandwidth demands, platforms may be clustered more densely over areas with greater demand (such as urban areas) and less densely over areas with lesser demand (such as over large bodies of water). In addition, the topology of an example network may be adaptable, allowing each platform to adjust its respective positioning in accordance with a change in the desired topology of the network.

The balloons of FIG. 1 may be high-altitude balloons that are deployed in the stratosphere. As an example, in a high altitude balloon network, the balloons may generally be configured to operate at stratospheric altitudes, e.g., between 50,000 ft and 70,000 ft or more or less, in order to limit the balloons' exposure to high winds and interference with commercial airplane flights. In order for the balloons to provide a reliable communication network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations. In one scenario, lateral propulsion may be employed to affect the balloon's path of travel.

Figure 2:
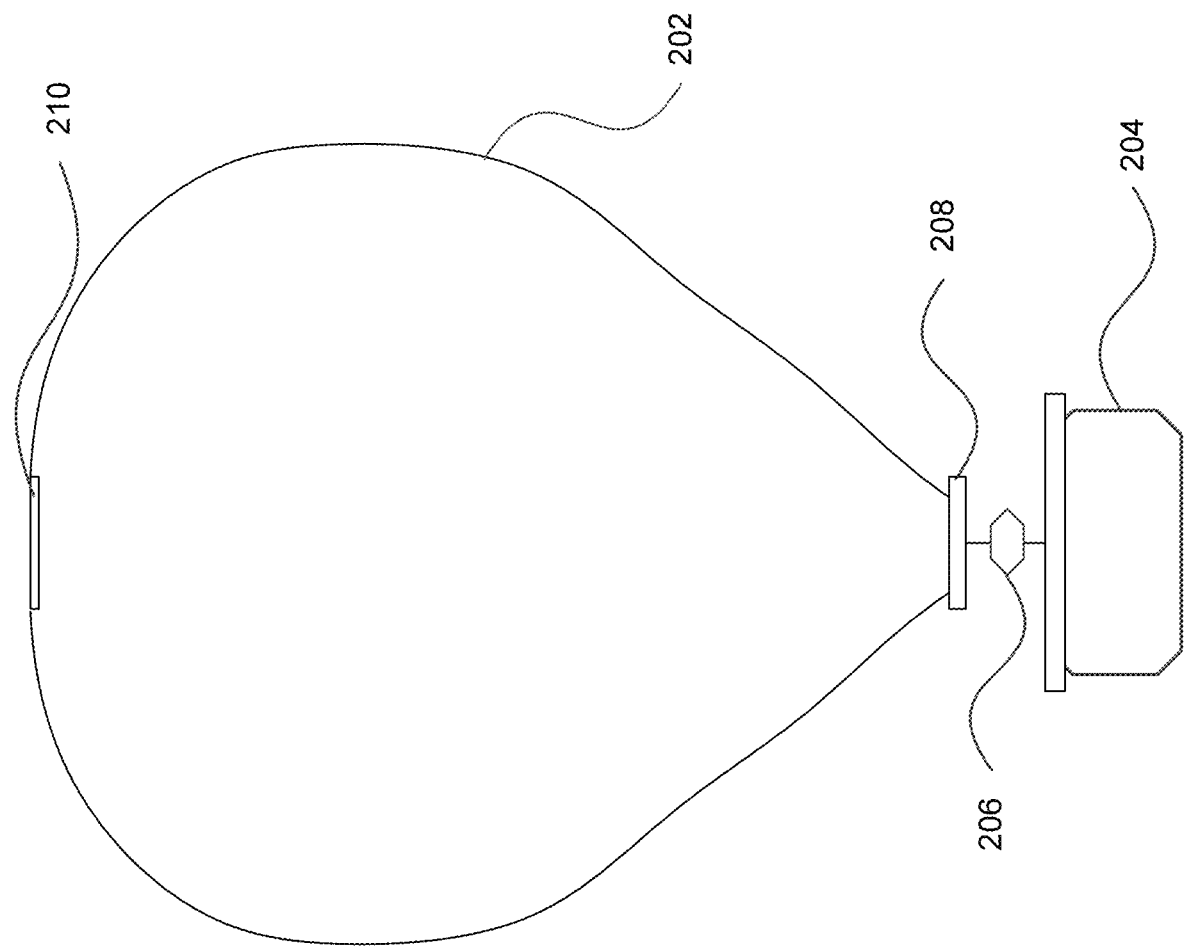
FIG. 2 illustrates an LTA platform in accordance with aspects of the disclosure.

In an example configuration, the high altitude balloon platforms include an envelope and a payload, along with various other components. FIG. 2 is one example of a high-altitude balloon 200, which may represent any of the balloons of FIG. 1. As shown, the example balloon 200 includes an envelope 202, a payload 204 and a termination (e.g., cut-down & parachute) device 206. A base plate 208 and/or a top plate 210 may be affixed to the envelope 202. The base plate 208 may be used to couple the envelope 202 to the payload 204, while the top plate 210 may be used in conjunction with filling the envelope and launching the LTA platform.

The envelope 202 may take various shapes and forms. For instance, the envelope 202 may be made of materials such as polyethylene, mylar, FEP, rubber, latex or other thin film materials or composite laminates of those materials with fiber reinforcements imbedded inside or outside. Other materials or combinations thereof or laminations may also be employed to deliver required strength, gas barrier, RF and thermal properties. Furthermore, the shape and size of the envelope 202 may vary depending upon the particular implementation. Additionally, the envelope 202 may be filled with different types of gases, such as air, helium and/or hydrogen. Other types of gases, and combinations thereof, are possible as well. Shapes may include typical balloon shapes like spheres and "pumpkins", or aerodynamic shapes that are symmetric, provide shaped lift, or are changeable in shape. Lift may come from lift gasses (e.g., helium, hydrogen), electrostatic charging of conductive surfaces, aerodynamic lift (wing shapes), air moving devices (propellers, flapping wings, electrostatic propulsion, etc.) or any hybrid combination of lifting techniques.

Figure 3:
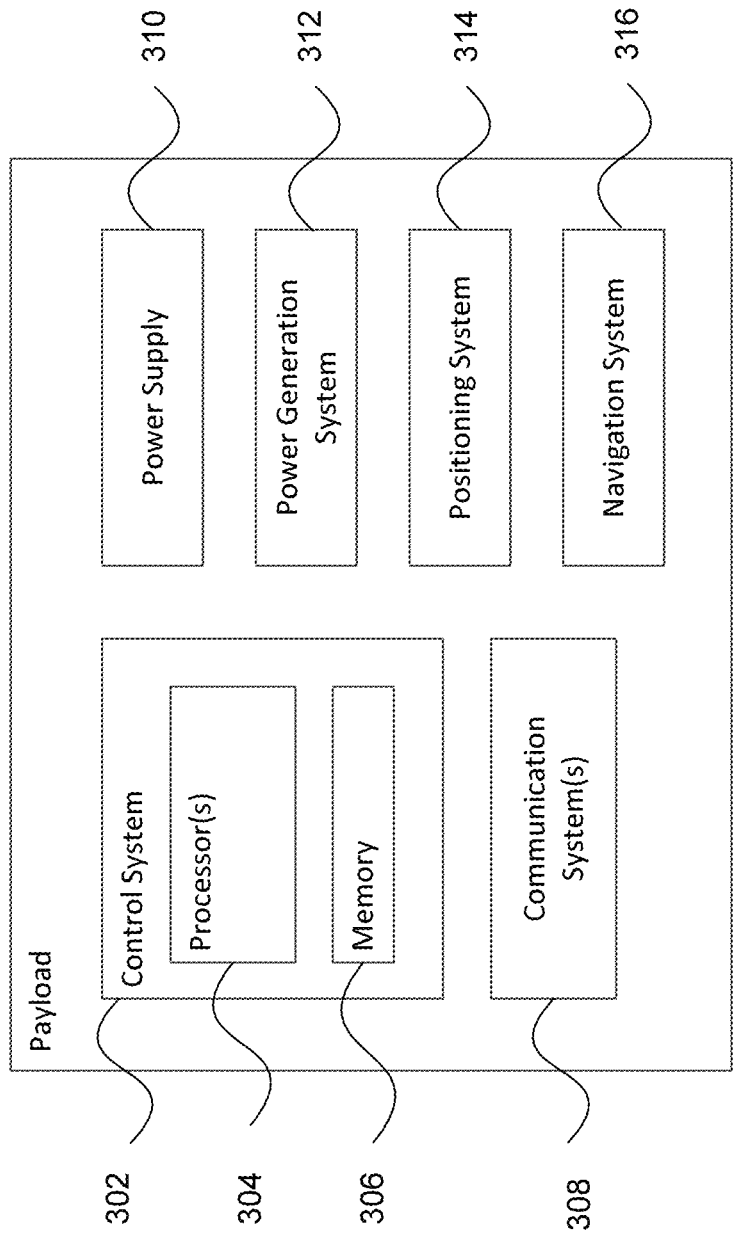
FIG. 3 is an example payload arrangement in accordance with aspects of the disclosure.

According to one example shown in FIG. 3, a payload 300 of a HAP platform includes a control system 302 having one or more processors 304 and on-board data storage in the form of memory 306. Memory 306 stores information accessible by the processor(s) 304, including instructions that can be executed by the processors. The memory 306 also includes data that can be retrieved, manipulated or stored by the processor. The memory can be of any non-transitory type capable of storing information accessible by the processor, such as a hard-drive, memory card, ROM, RAM, and other types of write-capable, and read-only memories. The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. The data can be retrieved, stored or modified by the one or more processors 304 in accordance with the instructions.

The one or more processors 304 can include any conventional processors, such as a commercially available CPU. Alternatively, each processor can be a dedicated component such as an ASIC, controller, or other hardware-based processor. Although FIG. 3 functionally illustrates the processor(s) 304, memory 306, and other elements of control system 302 as being within the same block, the system can actually comprise multiple processors, computers, computing devices, and/or memories that may or may not be stored within the same physical housing. For example, the memory can be a hard drive, memory card or other storage media located in a housing different from that of control system 302. Accordingly, references to a processor, computer, computing device, or memory will be understood to include references to a collection of processors, computers, computing devices, or memories that may or may not operate in parallel.

The payload 300 may also include various other types of equipment and systems to provide a number of different functions. For example, as shown the payload 300 includes one or more communication systems 308, which may transmit signals via RF and/or optical links as discussed above. The communication system(s) 308 include communication components such as one or more transmitters and receivers (or transceivers), one or more antennae, and a baseband processing subsystem. (not shown).

The payload 300 is illustrated as also including a power supply 310 to supply power to the various components of balloon. The power supply 310 could include one or more rechargeable batteries or other energy storage systems like capacitors or regenerative fuel cells. In addition, the balloon 300 may include a power generation system 312 in addition to or as part of the power supply. The power generation system 312 may include solar panels, stored energy (e.g., hot air), relative wind power generation, or differential atmospheric charging (not shown), or any combination thereof, and could be used to generate power that charges and/or is distributed by the power supply 310.

The payload 300 may additionally include a positioning system 314. The positioning system 314 could include, for example, a global positioning system (GPS), an inertial navigation system (INS), and/or a star-tracking system. The positioning system 314 may additionally or alternatively include various motion sensors (e.g., accelerometers, magnetometers, gyroscopes, and/or compasses). The positioning system 314 may additionally or alternatively include one or more video and/or still cameras, and/or various sensors for capturing environmental data. Some or all of the components and systems within payload 300 may be implemented in a radiosonde or other probe, which may be operable to measure, e.g., pressure, altitude, geographical position (latitude and longitude), temperature, relative humidity, and/or wind speed and/or wind direction, among other information. Wind sensors may include different types of components like pitot tubes, hot wire or ultrasonic anemometers or similar, windmill or other aerodynamic pressure sensors, laser/lidar, or other methods of measuring relative velocities or distant winds.

Payload 300 may include a navigation system 316 separate from, or partially or fully incorporated into control system 302. The navigation system 316 may implement station-keeping functions to maintain position within and/or move to a position in accordance with a desired topology or other service requirement. In particular, the navigation system 316 may use wind data (e.g., from onboard and/or remote sensors) to determine altitudinal and/or lateral positional adjustments that result in the wind carrying the balloon in a desired direction and/or to a desired location. Lateral positional adjustments may also be handled directly by a lateral propulsion system that is separate from the payload. Alternatively, the altitudinal and/or lateral adjustments may be computed by a central control location and transmitted by a ground based, air based, or satellite based system and communicated to the HAP. In other embodiments, specific HAPs may be configured to compute altitudinal and/or lateral adjustments for other HAPs and transmit the adjustment commands to those other HAPs.

Figure 4:
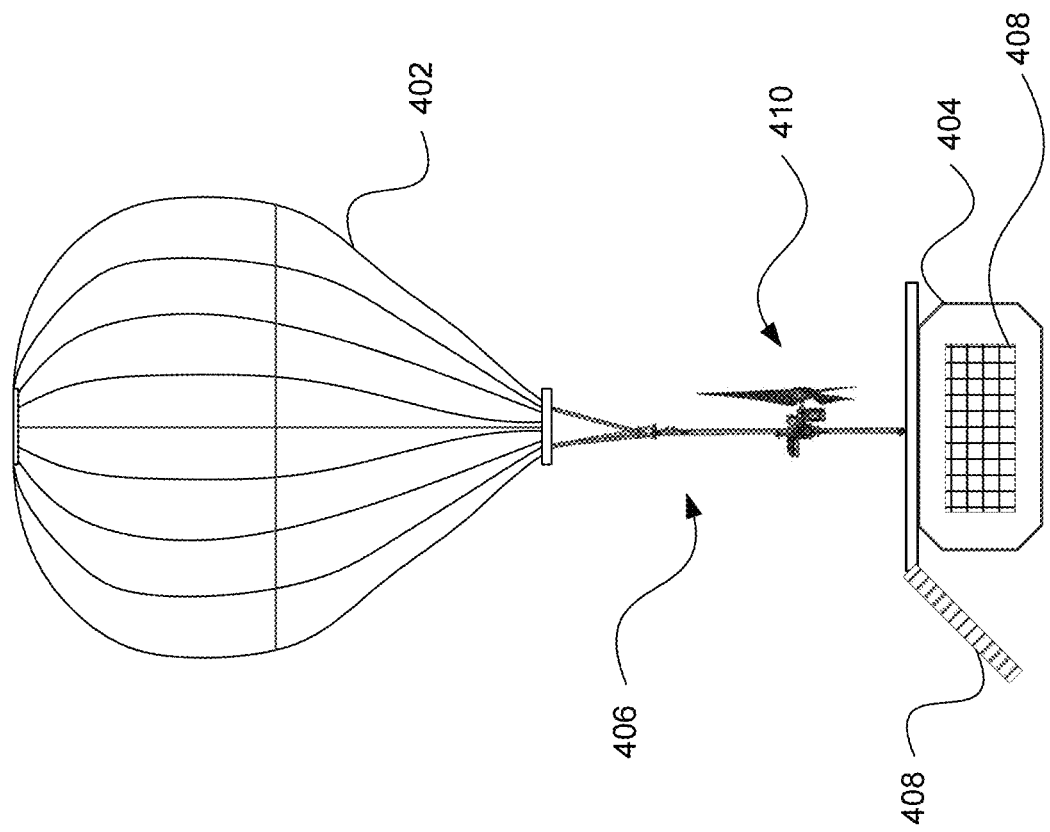
FIG. 4 is an example of an LTA platform with lateral propulsion in accordance with aspects of the technology.

In order to affect lateral position and/or velocity changes, the platform includes a lateral propulsion system. FIG. 4 illustrates one example configuration 400 of a balloon-type LTA HAP with propeller-based lateral propulsion, which may represent any of the balloons or other LTA craft of FIG. 1. As shown, the example 400 includes an envelope 402, a payload 404 and a down connect member 406 configured to couple the envelope 402 (e.g., via a base plate) and the payload 404 together. Cables or other wiring between the payload 404 and the envelope 402 may be run within or along the down connect member 406. One or more solar panel assemblies 408 may be coupled to the payload 404 or another part of the balloon platform. The payload 404 and the solar panel assemblies 408 may be configured to rotate about the down connect member 406 (e.g., up to 360° rotation or more), for instance to align the solar panel assemblies 408 with the sun to maximize power generation. Example 400 also illustrates a lateral propulsion system 410 having a propeller. While this example of the lateral propulsion system 410 is one possibility, the location could also be fore and/or aft of the payload section 404, or fore and/or aft of the envelope section 402, or any other location that provides the desired thrust vector. Details of the lateral propulsion system 410 are discussed below.

EXAMPLE CONFIGURATIONS

Figure 5B:
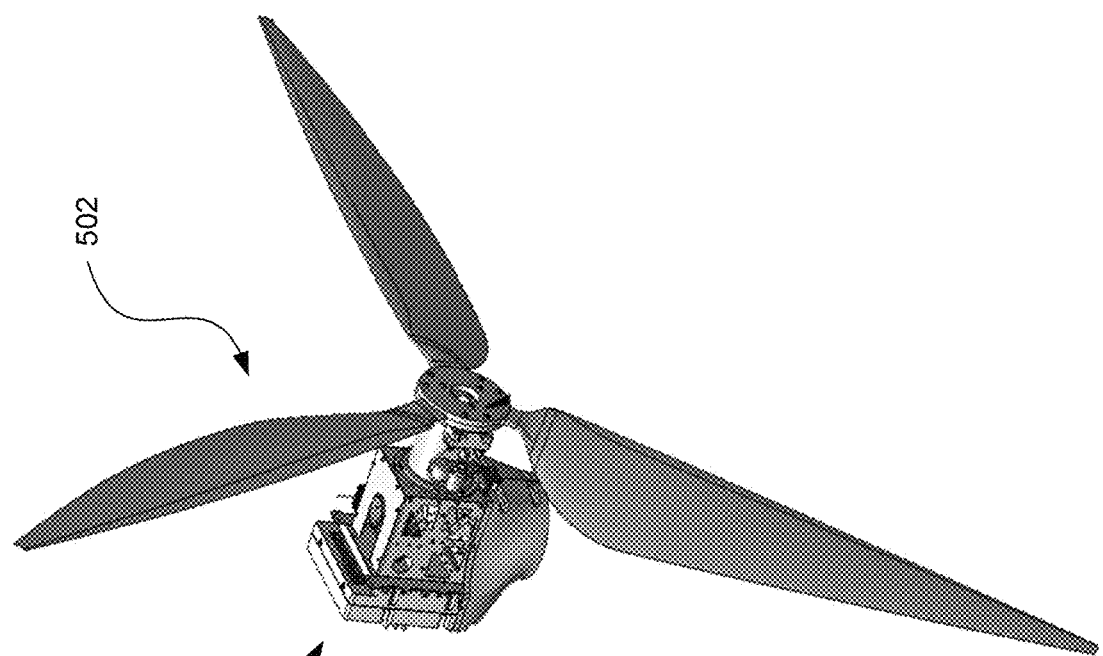
FIGS. 5A-B illustrate an example lateral propulsion system according to aspects of the technology.
Figure 5A:
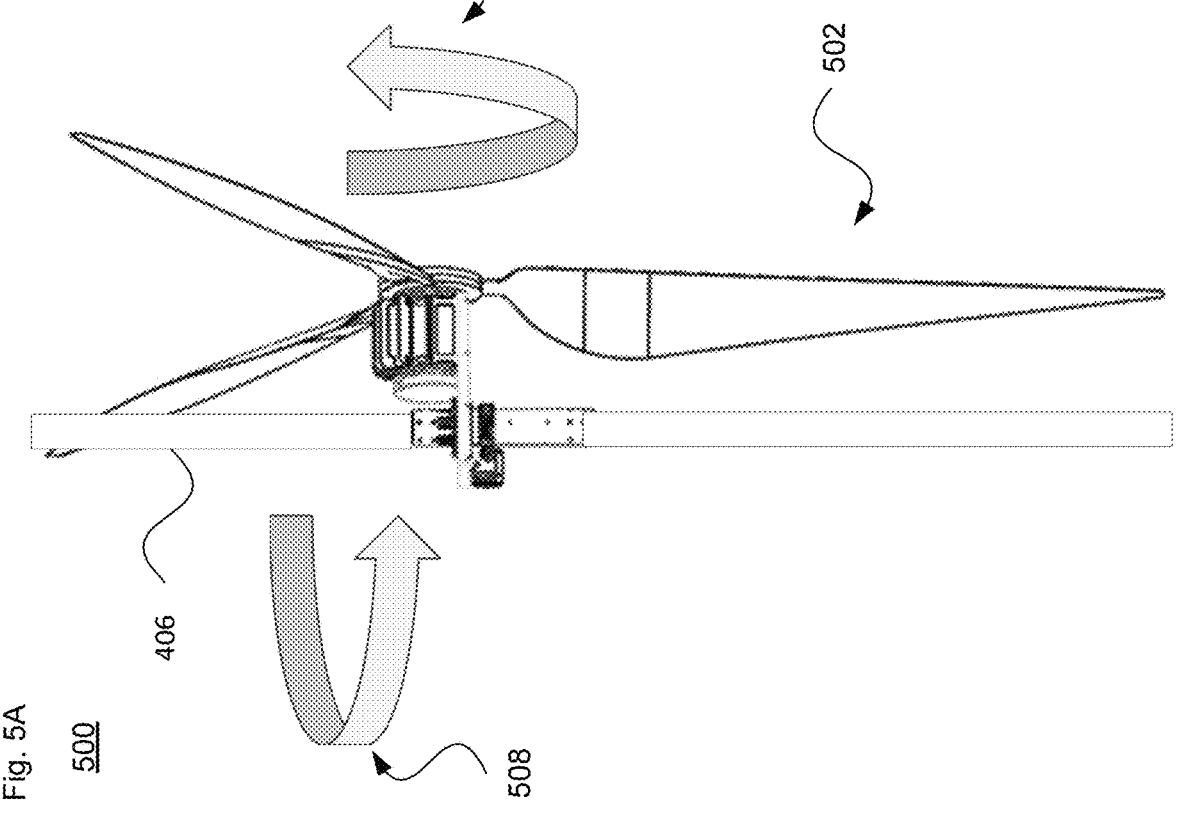

FIG. 5A illustrates an example 500 of the lateral propulsion system 410 of FIG. 4. Example 500 includes a propeller blade assembly 502 affixed to a control assembly 504, as shown in FIG. 5B. The control assembly 504 is configured to manage operation of the propeller assembly 502, including setting its pointing direction, speed of rotation and determining when to turn on the propellers and for how long. As shown in FIG. 5A, the blades of the propeller assembly 502 may be arranged generally parallel to the down connect member 406. While three blades are shown, two or more blades may be employed. The propeller is able to rotate in either a clockwise or counterclockwise direction as shown by arrow 506. The control assembly 504 is able to rotate the propeller assembly about a longitudinal axis of the down connect member 406 (e.g., up to or more than 360° rotation) as shown by arrow 508, changing the pointing direction of the propeller blade assembly 502 in order to change the HAP's heading.

While this configuration or other similar configurations gives the lateral propulsion system 410 two degrees of operational freedom, additional degrees of freedom are possible with other pointing mechanisms or air-ducting mechanisms. This flexible thrusting approach may be used to help counteract continually changing wind effects. Rotation of the control assembly 504 and propeller blade assembly 502 about the down connect member 406 is desirably independent of rotation of the solar panel assemblies (and/or payload) about the down connect member 406.

Figure 6A:
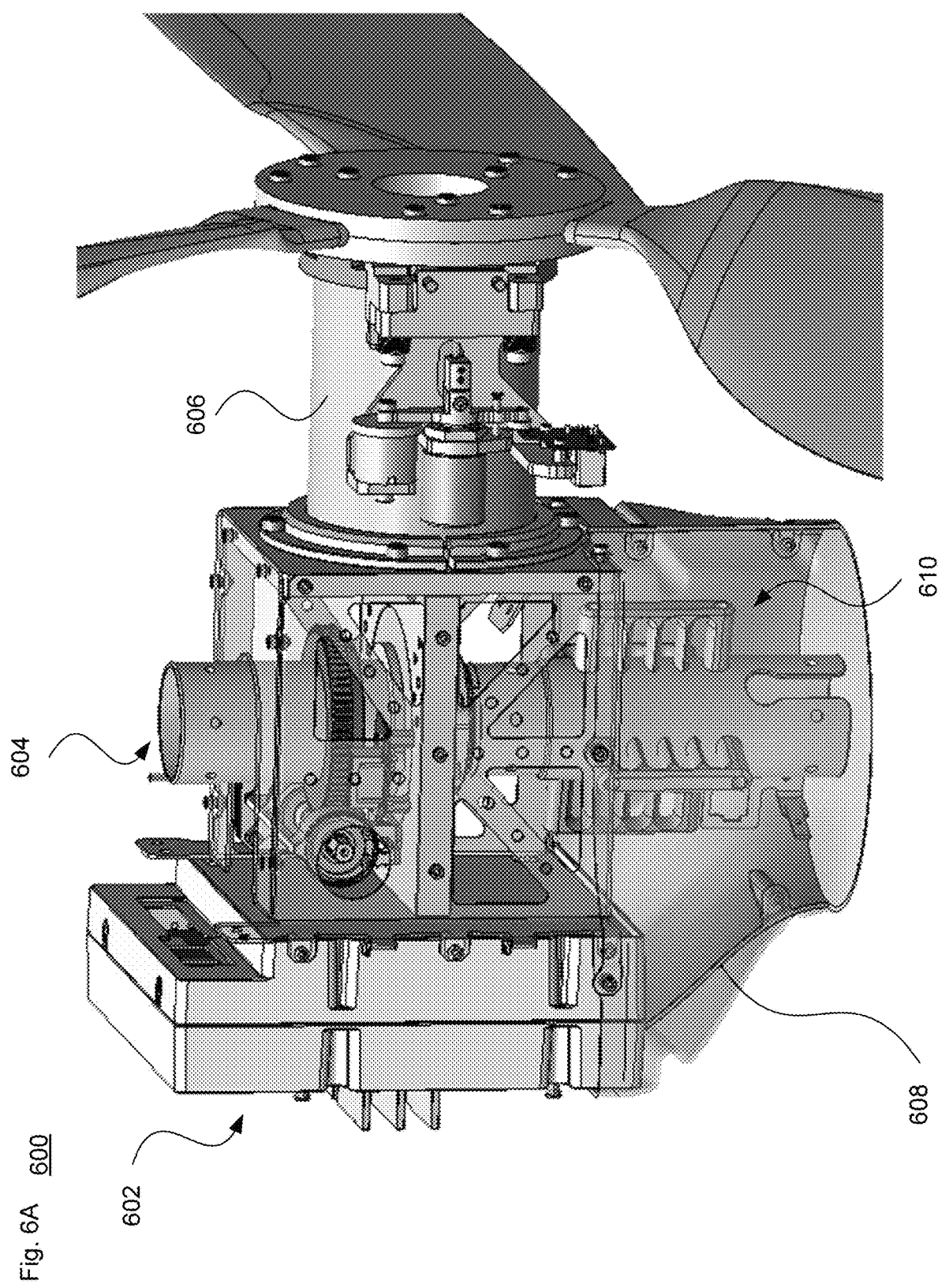

FIGS. 6A-C provides enlarged views 600, 620 and 640, respectively, of the control assembly 504. The control assembly may include an electronics module 602 for controlling operation of the assembly, a coupling section 604 that may be part of or otherwise connected to the down connect member, and a propeller motor assembly 606. As shown, an outer cover or shroud 608 may encompass a cable management structure 610, which is part of or secured to the coupling section 606. Power and data cables can be run through the cable management structure 610, for example connecting the electronics module 602 and other components of the lateral propulsion system to a power supply and/or control system of the payload. The cable management structure 610 is configured for power and/or data cables to be placed in a helical arrangement, with the ability to flex over a wide rotation range of the control assembly and propeller blade assembly, e.g., up to 360°-400° or more, while providing data/power to the lateral control system.

The payload or the lateral propulsion system (or both) may have on-board sensors (e.g., differential GPS or DGPS) to provide accurate attitude and/or position and velocity measurements, enabling highly accurate pointing of the propeller in an absolute direction as well as relative to the payload direction. These sensors are also able to provide measurement of the balloon platform's lateral speed. The propeller motor assembly 606 is configured to rotate the propeller in a clockwise or counterclockwise direction, with or without additional gearing. The propeller motor assembly 606 may be brushless, which can generate more torque than a brush-type motor. By way of example, the brushless motor may be a 1000 W motor, which is capable of rotating the propeller at up to 2500 rpm or more. The motor may employ a cooling system, for instance using cooling fins or air ducts (not shown) to remove excess heat from the motor or electronics. The system may only need to drive the propeller to achieve a lateral speed relative to the ground of between 1-15 m/s in order to significantly increase the ability of the balloon to stay on or return to station, avoid storms or particular geographic regions, or to mitigate effects of the wind. The speed may be dependent on the location of interest, wind currents at a particular location or altitude, season/time of year, time of day, and/or other factors.

As shown in FIG. 6B, there may be a pointing axis motor assembly 622 in addition to propeller motor assembly 606. The pointing motor assembly 606 is configured to cause the control assembly and propeller assembly to rotate about the down connect member. This may be done by actuating a worm gear mechanism 624. For instance, the pointing motor assembly 606 may include a stepper or brushless DC motor that drives the worm gear mechanism 624, which enables the assembly to rotate about the down connect member by up to 360°-400° or more. Rotation and pointing of the propeller unit could be accomplished with many different configurations of motors and gears or other mechanisms. Also shown in this figure is a braking mechanism 626, which can be used to stop rotation of the propeller.

The electronics module 602 may include a control subsystem 642 and a power subsystem 644 (e.g., as shown in FIG. 6C). A position sensor 646 may be part of the propeller motor assembly 606, to determine a relative alignment of the propeller assembly relative to the down connect member. Adjacent to the propeller motor assembly 606 is the braking mechanism 626, which may include a brake unit 648, a brake sensor 650, a holding magnet 652 and an actuator such as solenoid 654.

Figure 7:
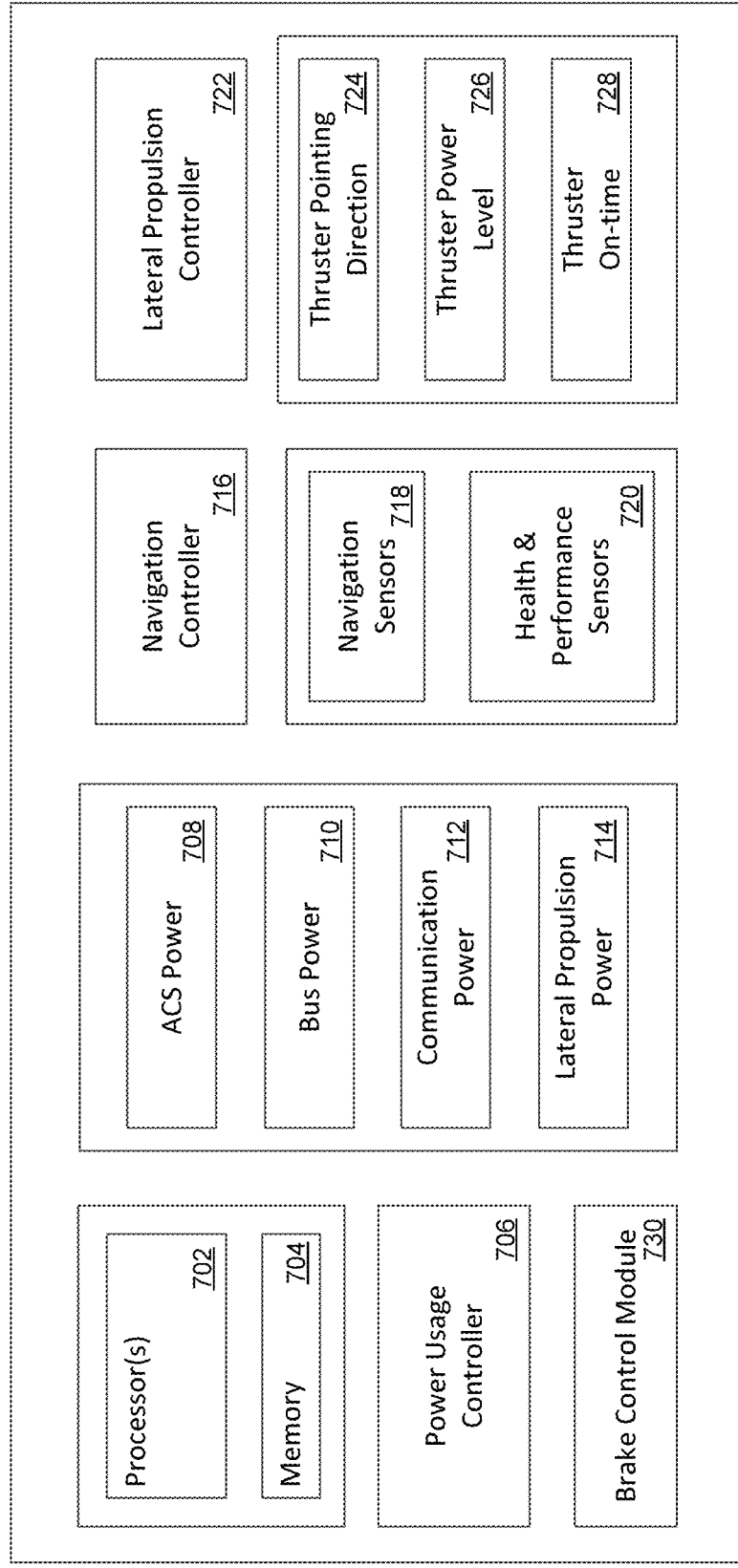
FIG. 7 is a block diagram of an example electronics module in accordance with aspects of the disclosure.

A block diagram of an exemplary electronics module 700 is illustrated in FIG. 7. The electronics module may be part of or separate from the navigation system 316 or the control system 302 of the payload. As shown, a CPU, controller or other types of processor(s) 702, as well as memory 704, may be employed within the electronics module 700 to manage aspects of the lateral propulsion system. The power subsystem may include a power usage controller 706 for managing various power subsystems of the electronics module, including for altitude control system (ACS) power 708 (e.g. to control buoyancy of the envelope), bus power 710, communication power 712 and lateral propulsion power 714. The power usage controller 706 may be separate from or part of the processor(s) 702.

The control subsystem may include a navigation controller 716 that is configured to employ data obtained from onboard navigation sensors 718, including an inertial measurement unit (IMU) and/or differential GPS, received data (e.g., weather information), and/or other sensors such as component health and performance sensors 720 (e.g., a force torque sensor) to manage operation of the balloon's systems. The navigation controller 716 may be separate from or part of the processor(s) 702. The navigation controller works with system software, ground controller commands, and health & safety objectives of the system (e.g., battery power, temperature management, electrical activity, etc.) and helps decide courses of action. The decisions based on the sensors and software may be to save power, improve system safety (e.g., increase heater power to avoid systems from getting too cold during stratospheric operation) or divert power to altitude controls or divert power to lateral propulsion systems.

When decisions are made to activate or make adjustments to the lateral propulsion system, the navigation controller then leverages sensors for position, wind direction, altitude and power availability to properly point the propeller and to provide a specific thrust condition for a specific duration or until a specific condition is reached (e.g., a specific lateral velocity or position is reached, while monitoring and reporting overall system health, temperature, vibration, and other performance parameters). In this way, the navigation controller can continually optimize the use of the lateral propulsion systems for performance, safety and system health. Upon termination of a flight or indication of an emergent condition, the navigation controller can engage the safety systems (for example the propeller braking mechanism) to prepare the system to descend, land, and be recovered safely.

Lateral propulsion controller 722 is configured to selectively control the propeller's pointing direction, manage speed of rotation, power levels, and determine when to turn on the propeller or off, and for how long. The lateral propulsion controller 722 thus oversees thruster pointing direction 724, thruster power level 726 and thruster on-time 728 modules. It can also manage a brake control module 730 to engage and/or disengage the braking mechanism. The lateral propulsion controller 722 and/or the brake control module may each be separate from or part of the processor(s) 702. Processor software or received human controller decisions may set priorities on what power is available for lateral propulsion functions (e.g., using lateral propulsion power 714). The navigation controller then decides how much of that power to apply to the lateral propulsion motors and when (e.g., using thruster power level 726). In this way, power optimizations occur at the overall system level as well as at the lateral propulsion subsystem level. This optimization may occur in a datacenter on the ground or locally onboard the balloon platform.

The lateral propulsion controller 722 is able to control the drive motor of the propeller motor assembly so that the propeller assembly may operate in different modes. Two example operational modes are: power control or rotational velocity control. The electronics module may store data for both modes and the processor(s) of the control assembly may manage operation of the drive motor in accordance with such data. For instance, the processor(s) may use the stored data to calculate or control the amount of power or the rotational propeller velocity needed to achieve a given lateral speed. The electronics module may store data for the operational modes and the processor(s) of the control assembly may manage operation of the drive motor in accordance with such data. For instance, the processor(s) may use the stored data to calculate the amount of current needed to achieve a given lateral speed. The processor(s) may also correlate the amount of torque required to yield a particular speed in view of the altitude of the balloon platform.

The processor(s) may control the drive motor continuously for a certain period of time, or may cycle the drive motor on and off for selected periods of time, e.g., using pulse width modulation (PWM). This latter approach may be done for thermal regulation of the drive motor. For instance, the propeller may be actuated for anywhere from 1 second to 5 minutes (or more), and then turned off to allow for motor cooling. This may be dependent on the thermal mass available to dissipate heat from the motor.

As noted above, the lateral propulsion controller 722 regulates the thruster pointing direction 724, such as by causing the pointing motor assembly to drive the worm gear mechanism in a first direction to rotate clockwise about the down connect longitudinal axis or in a second direction to rotate counterclockwise about the longitudinal axis.

Figure 8:
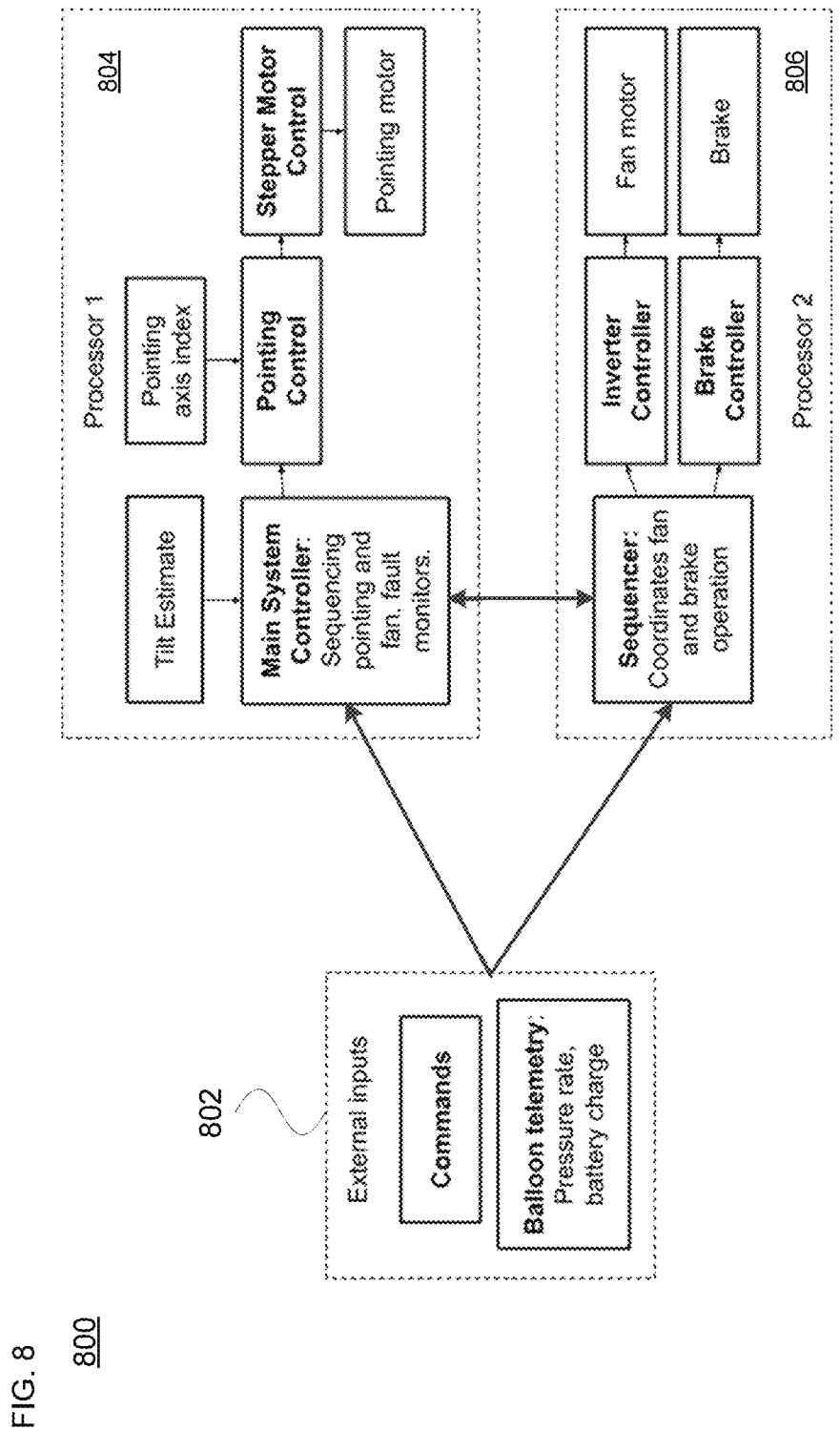
FIG. 8 illustrates an exemplary lateral propulsion controller arrangement in accordance with aspects of the technology.

FIG. 8 illustrates a view 800 of an exemplary functional implementation of the lateral propulsion controller. In this example, external inputs 802, such as control commands and/or balloon telemetry information (e.g., pressure rate, battery charge, etc.) are received and provided to one or more processors of the electronics module. For instance, a first processor 804 may control operation of the pointing axis motor assembly and a second processor 806 may control operation of the propeller motor assembly, which may include controlling operating of the braking mechanism via the brake control module.

By way of example, a pointing control module may receive a pointing axis index, which can indicate the pointing position of the propeller relative to the down connect member, how many degrees of rotation the propeller has moved relative to a default position, etc. In this example, such information is used by a stepper motor control module to control operation of the pointing axis motor assembly, for instance by rotating in a clockwise (or counterclockwise) direction once a threshold rotation amount has been exceeded (e.g., 320°) or a maximum rotation amount has been reached (e.g., 360° or 400°).

Propeller Assembly

According to one approach, the propeller blade assembly may have as large a blade diameter as possible to maximize power efficiency and thrust during stratospheric operation. However, the size and weight of this assembly may impact not only maximum float altitude but also launch of the LTA platform. In view of this, in some examples the overall propeller diameter may be on the order of 1-5 m, for instance approximately 2 m or more or less. Configurations using multiple propeller blade assemblies are possible to help with performance, vibrations, controls, reliability, etc.

Figure 9A:
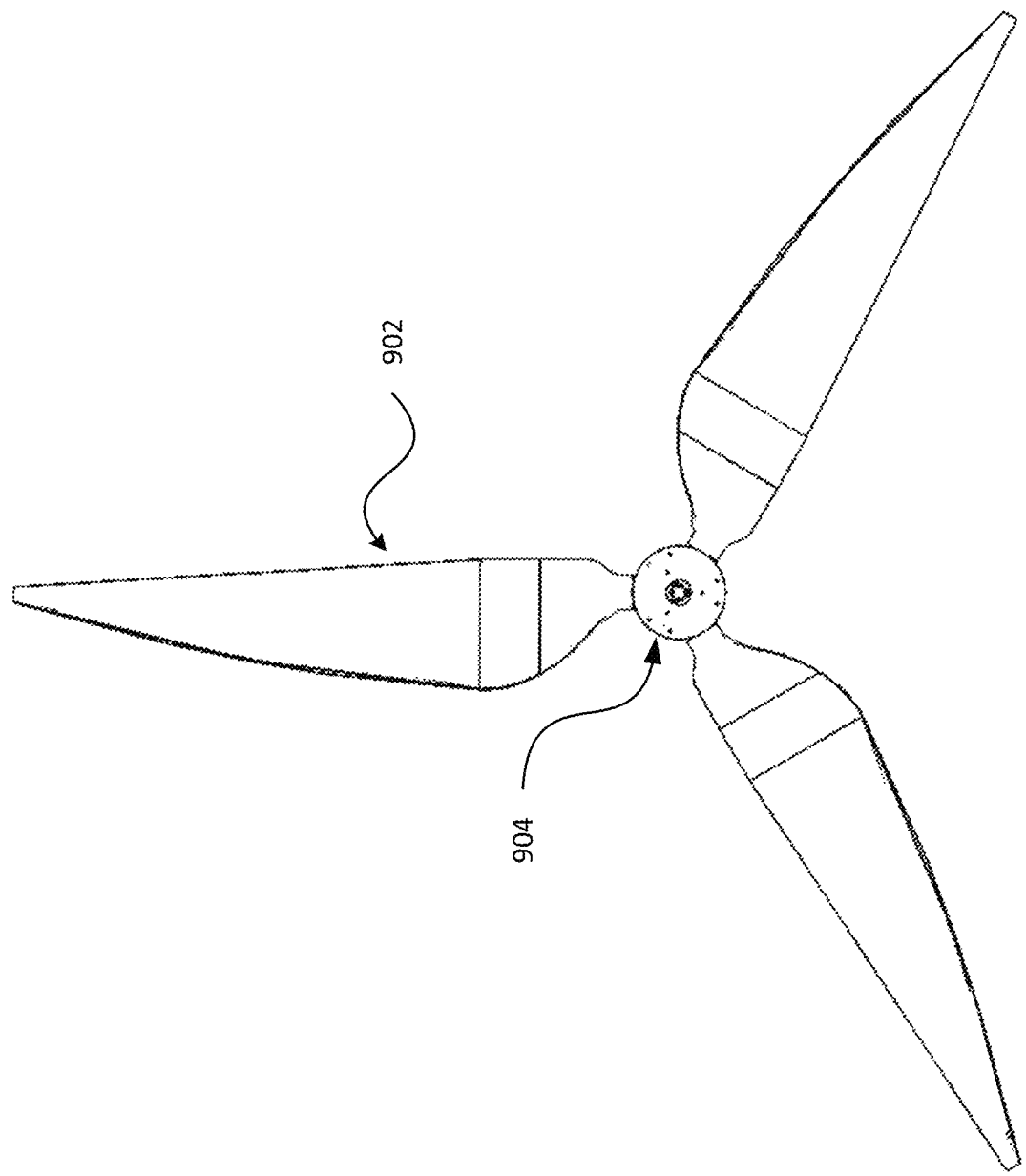
Figure 9B:
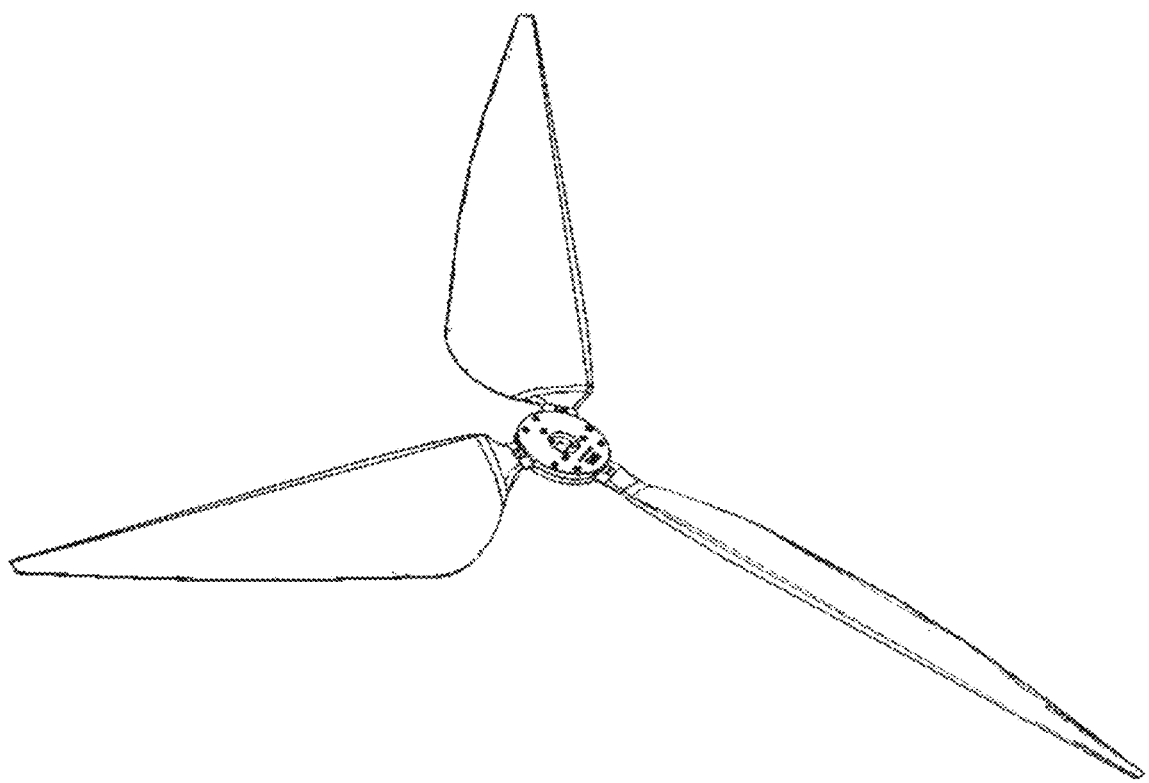

While a two-blade propeller arrangement may be used, a three-blade configuration as shown in front view 900 of FIG. 9A and perspective view 910 of FIG. 9B may provide more effective propulsion and vibration dynamics. By way of example, three blades can mitigate vibration more effectively than two blades, and can be easier to balance than two blades. In this example, the shape of the blades is designed to operate most efficiently at the low air-density operating altitude of the LTA platform along the stratosphere.

Figure 9C:
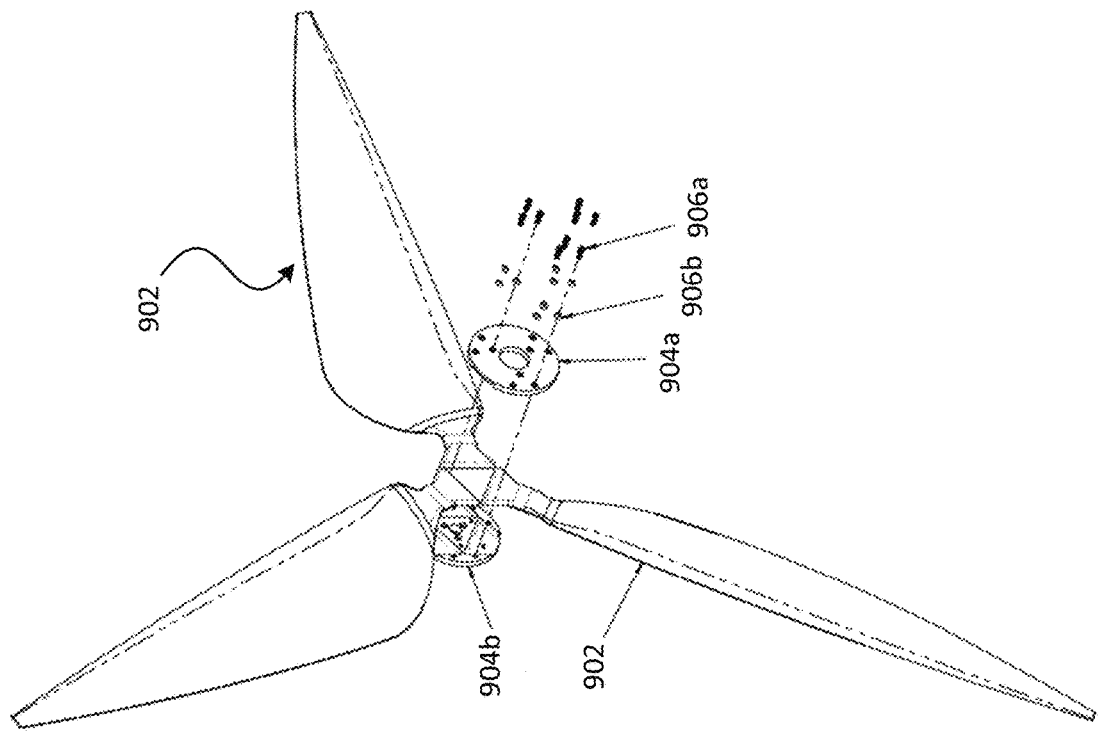

As indicated in the propeller blade assembly example of FIG. 9A, blades 902 are attached to a central hub 904. FIG. 9C illustrates an exploded view 920, showing that the hub 904 may include a pair of opposing hub elements 904a and 904b, affixed to one another and the blades 902 via fasteners such as bolts 906a and washers or nuts 906b.

FIG. 9D illustrates a view 930 of the hub elements 904a and 904b with the blades omitted. FIG. 9E illustrates a view 940, in which individual blades 902 are shown as being arranged around the hub 904.

The propeller blade assembly may encounter adverse situations, such as debris striking a blade, or the balloon envelope or a parachute of the HAP becoming entangled with the assembly. Other issues include fastener failure, vibration, fatigue or blade flutter. The result of such situations or issues can be a failure that renders the LTA platform entirely inoperable or shortens the operating lifetime of the device. Thus, according to one aspect of the technology, the propeller blade assembly is designed to meet certain requirements. These may include, by way of example, pressure, load and separation requirements (collectively, operational requirements), which may apply in different situations or scenarios.

For instance, the propeller blade assembly may be required to survive a load of at least 8-9 kg per blade. In particular, a given blade must be able to handle loads up to such a load threshold without collapsing, buckling or otherwise permanently deforming or breaking. According to one example, the load threshold is determined based on the blade surface area in accordance with a maximum expected dynamic pressure during descent or a wind gust of, e.g., 40-50 mph (e.g., on the order of 250 Pa, +/−20%) with a factor of safety of between 2-3.

Another requirement is that the propeller must not separate from the hub if there is an impact below a threshold amount. The threshold amount may be a load level, and the blade should not fail (e.g., permanently deform) if a load is below the threshold. By way of example, the propeller is configured to shed a load on the order of 1000-1200 newtons, or more or less. Thus, if a portion of the LTA craft impacts the propeller during descent, the propeller will not separate from the hub.

According to a further operational requirement, no part of the propeller should separate (e.g., break off) upon impact by an object below a threshold mass at a given velocity. By way of example, this threshold mass may be on the order of 5-15 kg, and the impact velocity may be between 10-20 m/s. This could occur, for instance, if a plate or other section of the balloon envelope hits a blade during descent of the LTA craft.

And according to yet another requirement, no part of the propeller should separate (e.g., break off) upon entanglement with a portion of the balloon envelope below a threshold amount of force. Here, for instance, the force threshold may be on the order of 5500-6500 newtons. In one example, entanglement could occur during an uncontrolled descent. Here, the envelope and down connect member may be descending at terminal velocity, and become instantaneously arrested by a parachute when entangled with the propeller.

According to one aspect of the technology, each of these operational requirements must be satisfied by the propeller hub assembly. In certain scenarios, any combination of the requirements may be satisfied by the assembly. In order to satisfy such requirements, the propeller blade assembly may be configured as follows.

Figure 10A:
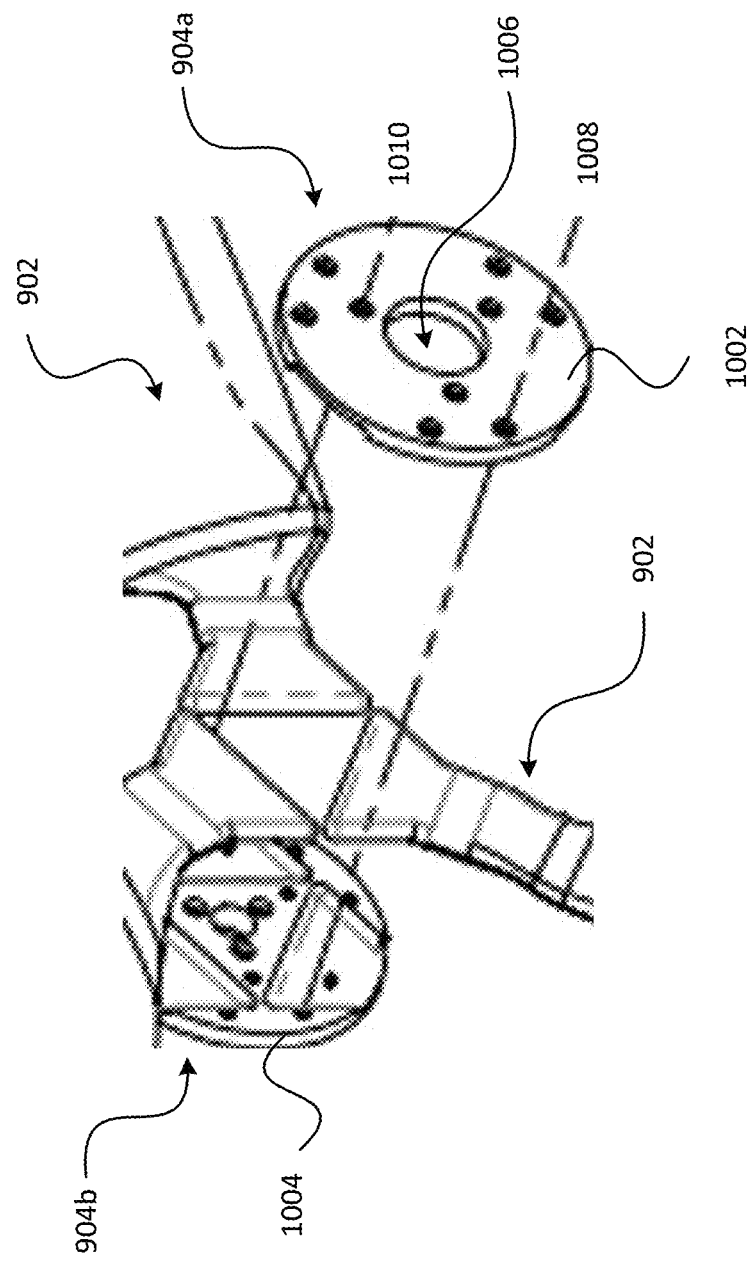
FIGS. 10A-B illustrate portions of the assembly of FIGS. 9A-D in accordance with aspects of the technology.

The central hub elements may be made of aluminum (e.g., machined aluminum), for example. As shown in enlarged view 1000 of FIG. 10A, the two hub elements 904a and 904b may be circular, having a planar outer surface 1002 facing away from the propeller blades, and a contoured inner surface 1004 facing towards the propeller blades. Central opening 1006 is configured to receive a rotatable shaft that is coupled to the propeller motor assembly (not shown). As shown in this figure, each hub element 904 includes inner and outer openings disposed, respectively adjacent the inner and outer perimeters of the hub element. For instance, as seen by dash-dot lines 1008 and 1010, pairs of inner and outer openings are aligned between the hub elements to secure each blade.

Figure 10B:
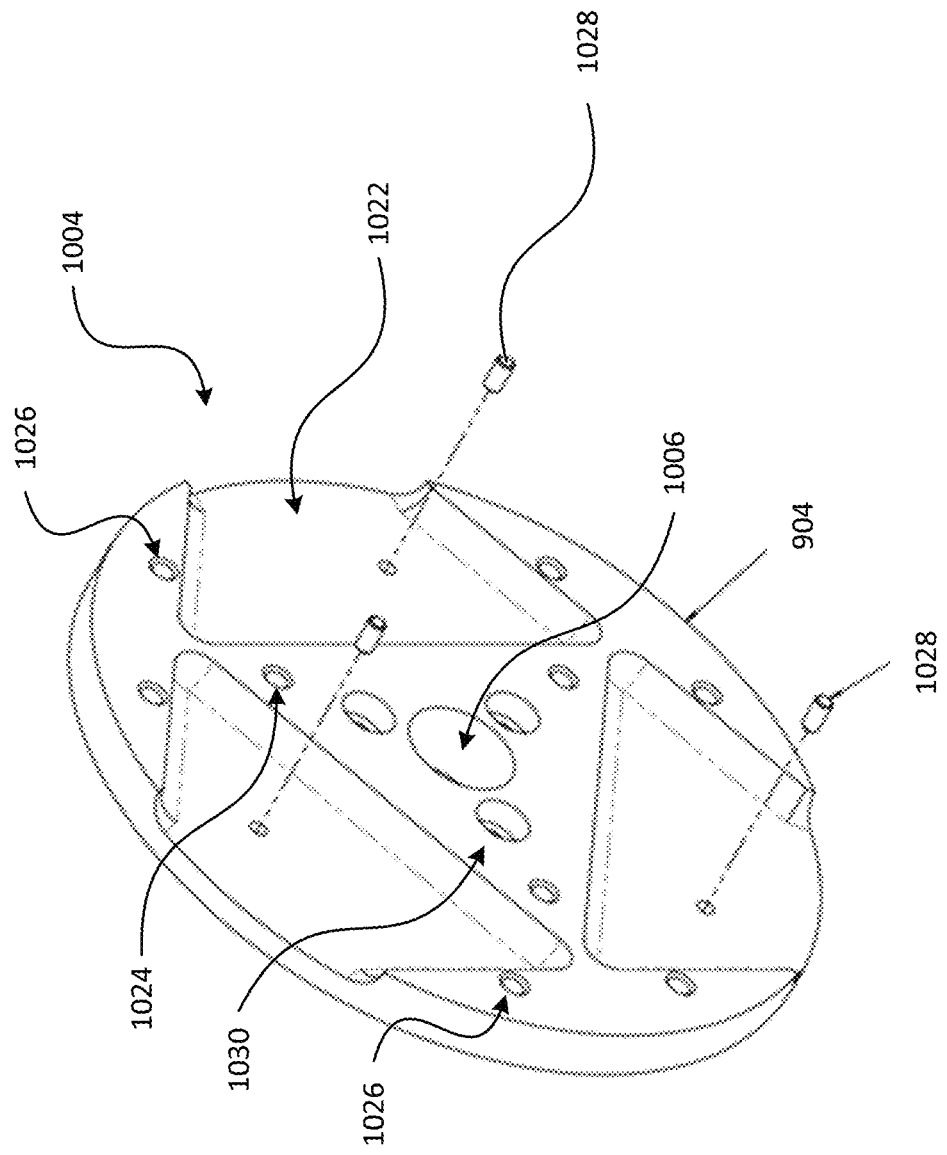

As seen in view 1020 of FIG. 10B, the inner surface 1004 includes a set of receptacles 1022 that is adapted to receive the root structure of the blades. In this example, each receptacle 1022 may be, e.g., triangular or trapezoidal to match the root structure of the blades. Receptacles 1024 and 1026 correspond to the inner and outer openings of FIG. 10A, and are adapted to receive fasteners that secure the two central hub elements together. The fasteners may be, e.g., M5 socket head cap screw (SHCS) type fasteners, although other sizes and head configurations may be employed. Dowel pins 1028 may be used to ensure correct orientation of the blade between the hub elements, e.g., so that one or more of the blades is not installed upside down. And a set of receptacles arranged around the central opening may receive fasteners (e.g., 5M SHCS-type fasteners) to secure the hub assembly to the rotor shaft.

Figure 11B:
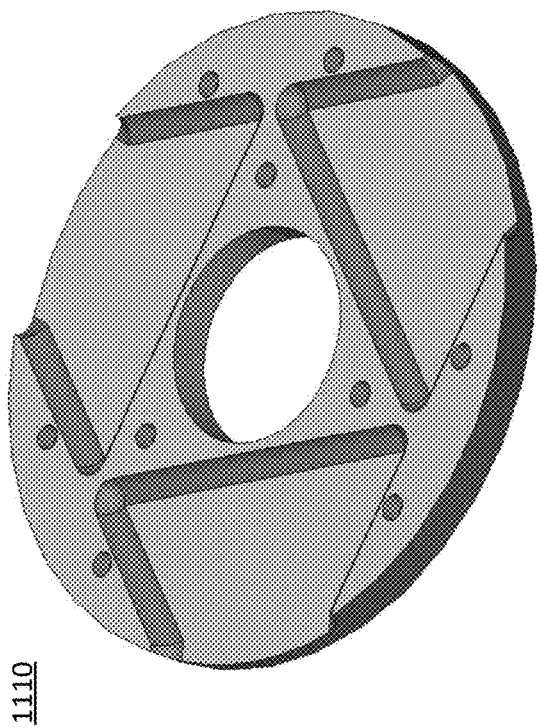
FIGS. 11A-D illustrate an example of a first hub element in accordance with aspects of the technology.
Figure 11D:
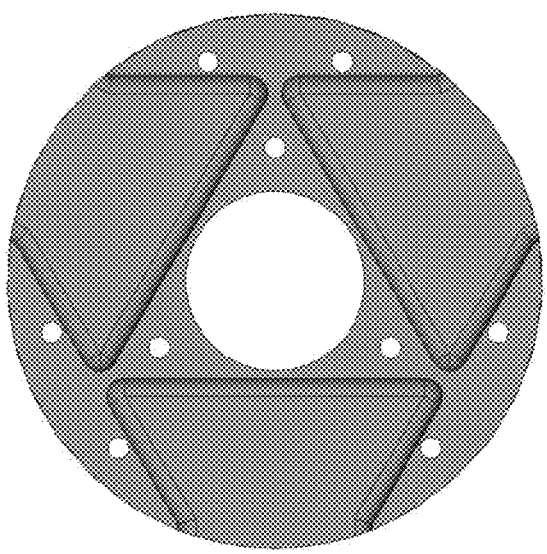
Figure 11A:
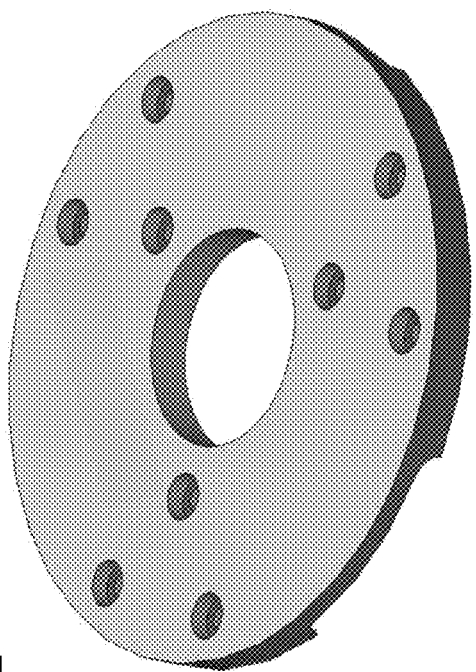
Figure 11C:
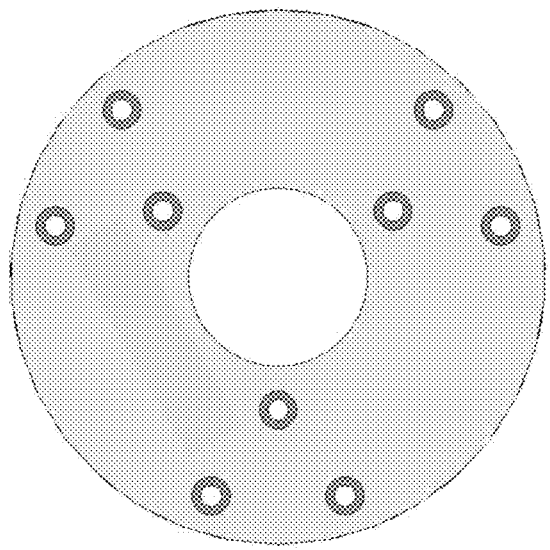
Figure 12B:
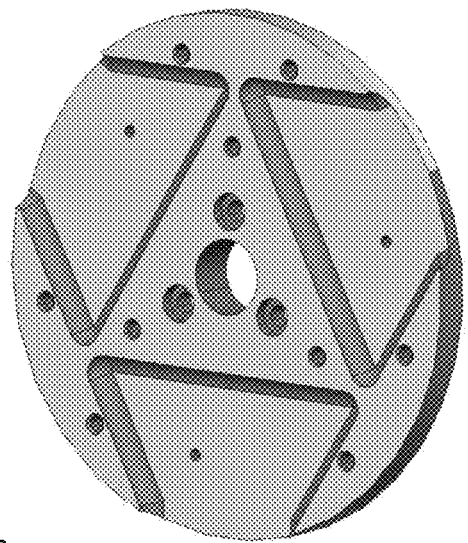
FIGS. 12A-D illustrate an example of a second hub element in accordance with aspects of the technology.
Figure 12D:
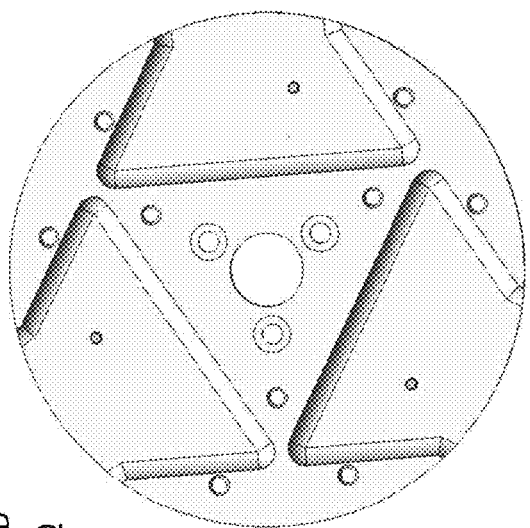
Figure 12A:
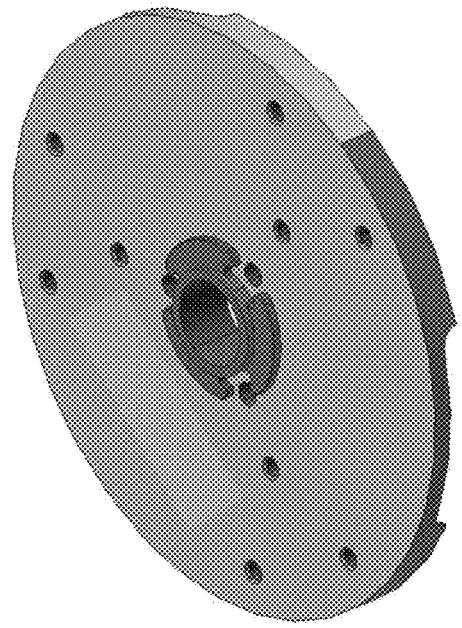
Figure 12C:
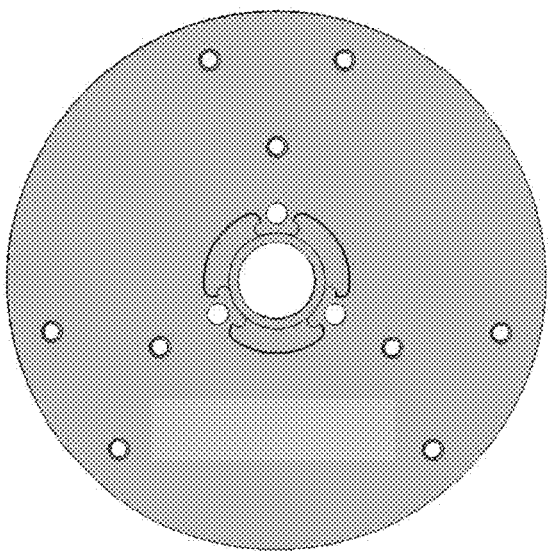

FIGS. 11A-D illustrate an example of hub element 904a, and FIGS. 12A-D illustrate an example of hub element 904b. In particular, FIG. 11A illustrates a perspective view 1100 of the outer surface of hub element 904a, FIG. 11B illustrates a perspective view 1110 of the inner surface, FIG. 11C illustrates a plan view 1120 of the outer surface, and FIG. 11D illustrates a plan view 1130 of the inner surface. Similarly, FIG. 12A illustrates a perspective view 1200 of the outer surface of hub element 904b, FIG. 12B illustrates a perspective view 1210 of the inner surface, FIG. 12C illustrates a plan view 1220 of the outer surface, and FIG. 12D illustrates a plan view 1230 of the inner surface.

Because the stratosphere is a challenging and somewhat unique environment, and because the LTA platform may be designed for station-keeping and long-term trajectory planning, the blades of the propeller blade assembly have certain features that may not be employed in other types of systems. This includes the ability to provide maximum power for limited durations of time, with as light a propeller as possible. Due to this, the propeller blade assembly may not be able to spin up to full speed (e.g., 2000-3000 rpm or more) while at sea level or otherwise at higher air density levels below the stratosphere.

Figure 13B:
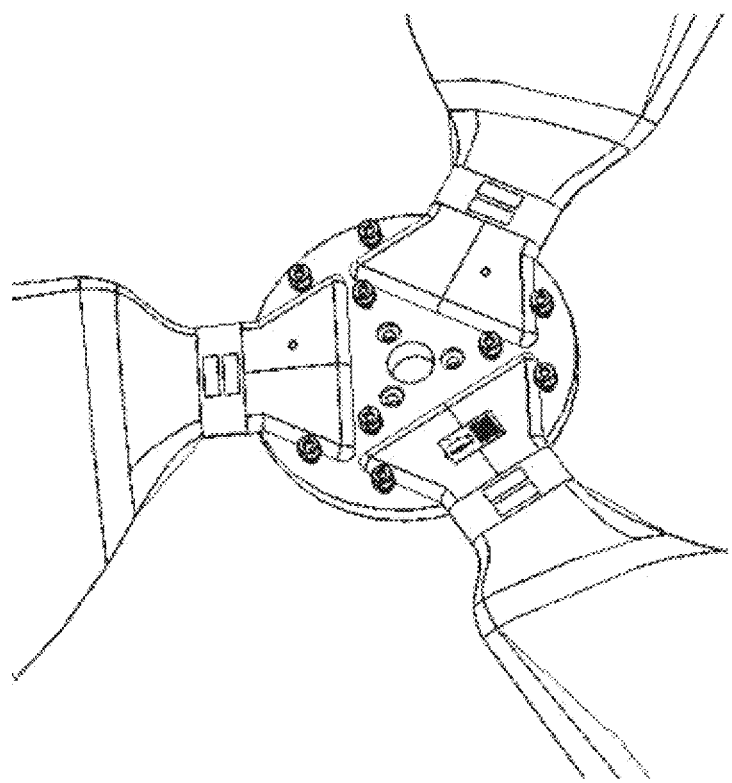
FIGS. 13A-B illustrate an example blade and hub arrangement in accordance with aspects of the technology.
Figure 13A:
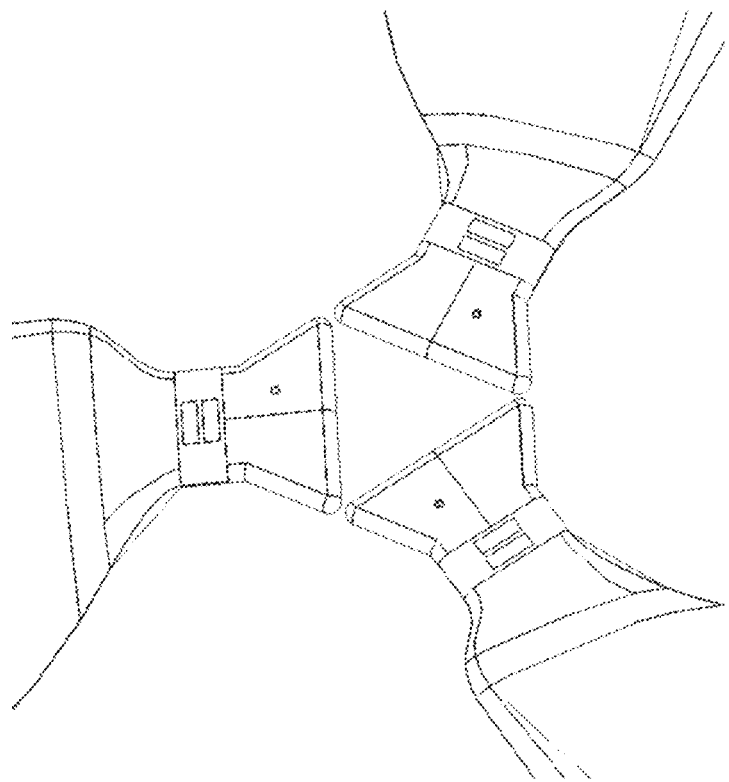

The blades in this propeller implementation are sandwiched between the two hub elements 904a and 904b, with the root structure of each blade received within a corresponding receptacle 1022 of each hub element 904. Fasteners that secure the hub elements together provide the clamping force to keep these propeller roots in the receptacles of the hub halves. FIG. 13A illustrates a view 1300, showing root sections of three blades arranged in a triangular configuration with the hub omitted. FIG. 13B illustrates another view 1310 with the three blades seated in the receptacles of one of the hub elements.

The blades may be formed of different materials and use different types of reinforcement and support elements, including one or more spars. For instance, as shown in example 1400 of FIG. 14A, a series of layers (plies) is arranged on either side of a core that substantially fills the space between two outer skins. By way of example, core 1402 may be a foam core of, e.g., polystyrene, which may be extruded, machined or otherwise fabricated to taper from a first end to a second end. The larger end of the core 1402 is disposed adjacent to the root structure of the blade. Each side of the core 1402 is at least partly covered by a reinforcement ply 1404 of an aramid (e.g., Kevlar®) or equivalent material. The reinforcement plies 1404 are configured so that if the blade is damaged, any broken pieces do not disengage from the propeller assembly. This can prevent significant damage to the LTA platform, as well as reduce the likelihood of a blade piece falling to the ground.

Figure 14A:
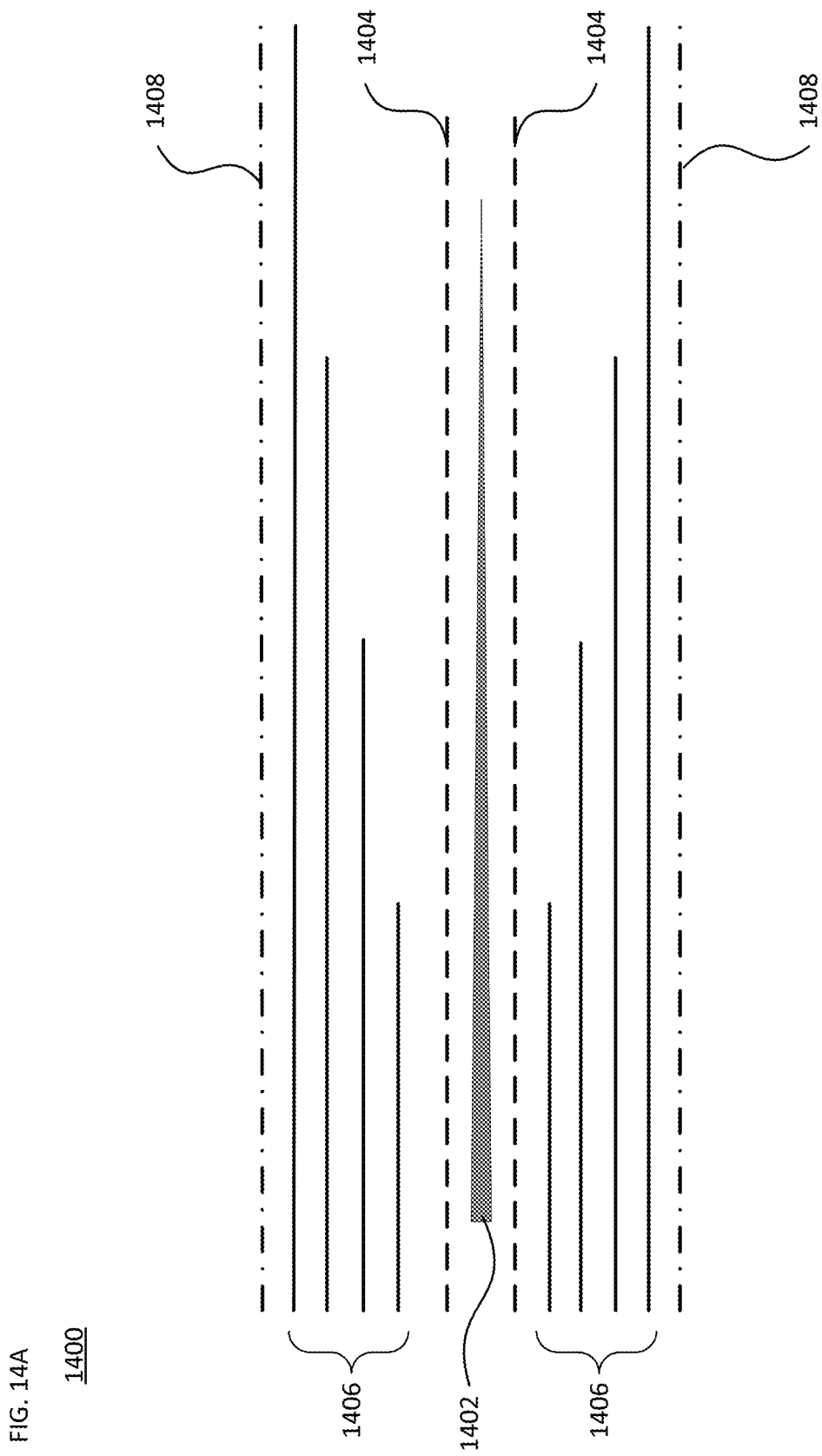
FIGS. 14A-F illustrate propeller blade features in accordance with aspects of the technology.

In this example, a series of plies 1406 of, e.g., carbon fabric, are then arranged in layers of increasing length. These plies 1406 form a spar cap that are arranged over the aramid and core layers. While four plies 1406 are shown in the series, two or more layers can be employed. The series of plies may be arranged in layers of increasing length, for instance with an outermost layer being longer than the innermost layer as shown in FIG. 14A. On either side of the spar caps is an outer layer or skin ply 1408 of the blade. The plies 1408 may be formed of a single layer of carbon fiber, e.g., a T700 type material or equivalent. For instance, in one configuration, there may be on the order of 24,000 individual fibers per strand or bundle (a "tow") of the carbon fiber fabric, which is flattened out to a tape arrangement to provide unidirectional reinforcement. The fabric may have a weave orientation relative to the main blade axis of +/−45°. Thus, in this example, if the blade span is referenced to 0 degrees, then the carbon fabric (e.g., woven in tows at right angles to one another) would be laid down so the tow direction is at +/−45° relative to the blade reference. The fabric may have a weight on the order of 250-400 grams per square meter.

Figure 14B:
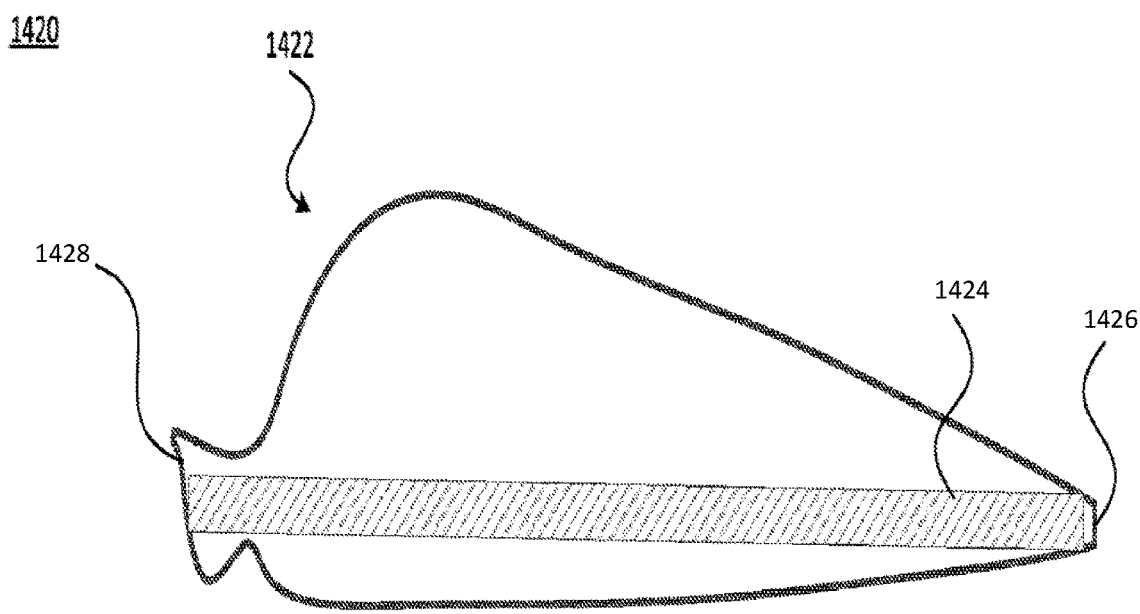
Figure 14C:
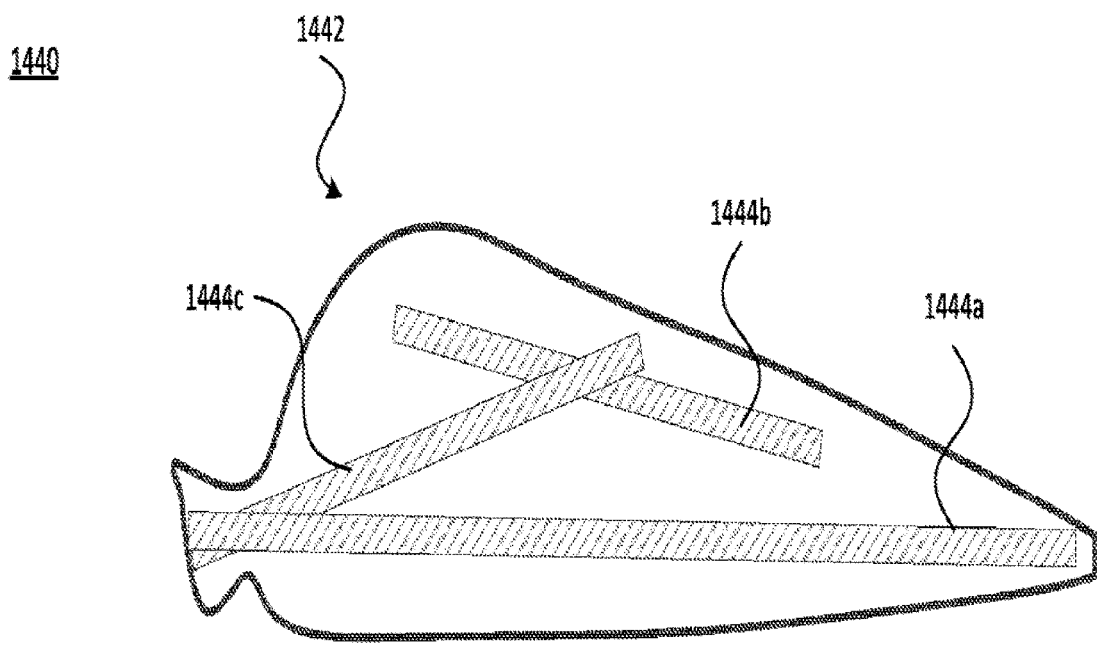

FIGS. 14B and 14C illustrate two examples of a blade with one or more aramid reinforcement plies. As shown in example 1420 of FIG. 14B, one side of blade 1422 is arranged with reinforcement layer 1424 extending longitudinally from tip 1426 to root structure 1428. Here, the other side of the blade 1422 (not shown) may have another aramid layer extending similarly between the tip and root structure. For instance, the layer(s) 1424 may extent substantially along (e.g., 75% or more) or the entire distance between the tip and root structure. In example 1440 of FIG. 14C, a set of aramid reinforcement plies 1444a-1444c are arranged along one side of blade 1442. Here, as in example 1420, ply 1444a may extend substantially or completely between the tip and root structure. As shown, plies 1444b and 1444c are arranged along other portions of the blade 1442. The plies 1444 may intersect or otherwise overlap at one or more points. And as with the example 1420, the other side of the blade 1442 may have equivalent aramid plies arranged in a similar manner. In one scenario, the aramid plies may be, e.g., strips of aramid tape, for instance between ½" to 2" wide. In another scenario, there may be a single continuous sheet of aramid arranged to cover most or substantially all of the surface area (e.g., 60-95%) of the blade. The larger the amount of surface area that is covered by the aramid, the more likely it would be that a broken piece of the blade would not disengage or otherwise fall off of the propeller assembly.

Figure 14D:
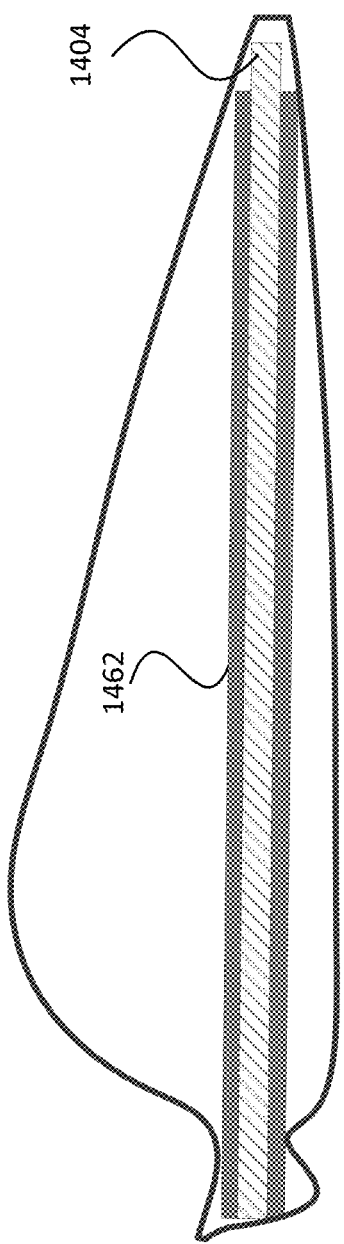
Figure 14E:
Figure 14F:
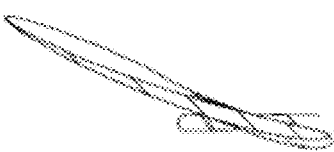

View 1460 of FIG. 14D is a partial cutaway of a blade, showing the reinforcement ply 1404 being aligned along the blade in relation to one or more layers of spar cap 1462. By way of example, the reinforcement ply may be aligned along the blade longitudinally with both the core and the spar cap. FIGS. 14E and 14F illustrates a view 1480, showing a cross section of a blade taken along the A-A line.

A resin, such as a low-viscosity resin, is applied to efficiently saturate the carbon fiber shell. A hardener may be applied to the resin. The leading and/or trailing edges of the blade may be bonded with infusion resin filler and microspheres. The microspheres are a low density filler for epoxy that can be formed as tiny hollow spheres of, e.g., silica, which are thus very light. This allows the buildup of solid volumes of resin within the blade structure without incurring an unnecessary weight penalty. The blade may then be cured until gelation occurs, and then a post-cure process may be employed for a minimum amount of time at a selected temperature, e.g., 8 hours at 60° C. Once cured, the blade may be painted. The paint may include UV protection, which can be important during extended use (e.g., weeks, months or longer) in the stratosphere.

Each blade may be, e.g., on the order of 0.7-1.2 m in diameter so that the propeller blade assembly has as large a blade diameter as possible to maximize power efficiency and thrust. This may be accomplished with a lightweight configuration for each blade, which may be on the order of 400 g-600 g, or more or less.

Figure 15C:
FIGS. 15A-D illustrate load shedding scenarios in accordance with aspects of the technology.
Figure 15B:
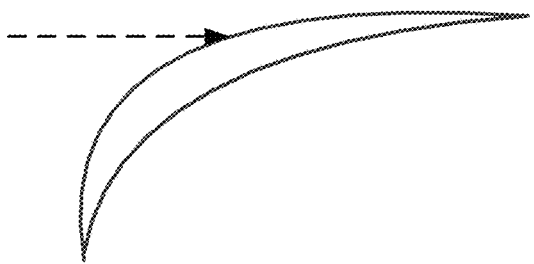
Figure 15A:
Figure 15D:
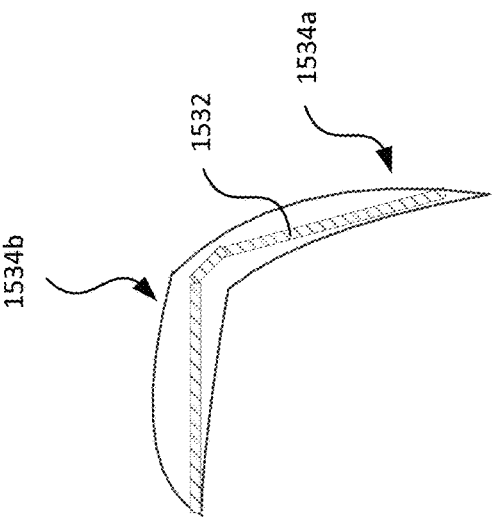

As noted above, one requirement for the propeller blade assembly is the ability to shed a load which may exceed 100 kg, without the blades breaking or the propeller separating from the hub assembly. FIGS. 15A-C illustrate one scenario in which a blade sheds a load such as the balloon envelope portion of the HAP. View 1500 of FIG. 15A shows the blade in an unloaded condition, which may be when the propeller blade assembly is rotating during operation or when it is stationary. View 1510 of FIG. 15B indicates via the arrow that a portion of the HAP or other object has impacted the blade, causing it to flex in a downward direction. Without the reinforcement ply layers and/or spar, the blade might break. However, these elements permit the blade to flex significantly so that the load falls off of the blade and is shed. Then, as shown in view 1520 of FIG. 15C, the blade is able to return to its original shape in the unloaded condition. Even if the load exceeds the threshold and the blade does break, it is configured so that the broken piece does not come off of the blade, and the blade itself does not disengage from the hub. For instance, FIG. 15D illustrates a view 1530 of a broken blade, in which reinforcement ply 1532 secures broken portion 1534a to portion 1534b.

Thus, it can be seen that a propeller blade assembly designed to satisfy certain requirements (e.g., pressure, load and/or separation requirements) is able to operate in the stratosphere in such a way that allows the LTA platform to remain aloft and provide telecommunications or other services for an extended period of time.

The foregoing examples are not mutually exclusive and may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A propeller blade assembly for use with a lighter-than-air craft, the propeller blade assembly comprising:
   a hub assembly having a central opening configured to receive a rotatable shaft of a propeller motor assembly of the lighter-than-air craft; and
   a plurality of propeller blades, each blade of the plurality of propeller blades having a root structure at a first end and a tip at a second end opposite the root structure, the root structure being secured to the hub assembly, wherein each respective blade includes:
   a centrally disposed foam core extending between the root structure and the tip, the core having a top surface arranged facing a first exterior surface of the blade and a bottom surface arranged facing a second exterior surface of the blade opposite the top surface and the first exterior surface;

a first spar cap disposed along the top surface of the core;

a second spar cap disposed along the bottom surface of the core;

a first aramid layer extending along said core between said top surface and said first spar cap, wherein said first aramid layer is configured to prevent a blade fragment from separating from the respective blade; and a pair of outer layers, a first one of the outer layers adjacent and overlying the first spar cap on said top surface of said core, and a second one of the outer layers adjacent and overlying the second spar cap on said bottom surface of said core.

2. The propeller blade assembly of claim 1, including a second aramid layer extending along said core between said bottom surface and said second spar cap.

3. The propeller blade assembly of claim 2, wherein the first and second aramid layers extends from the first end to the second end of the respective blade.

4. The propeller blade assembly of claim 3, wherein the first and second aramid layer each comprises a set of aramid strips.

5. The propeller blade assembly of claim 4, wherein the set of aramid strips are arranged to extend in different directions relative to each other on a common plane.

6. The propeller blade assembly of claim 4, wherein each strip of the set of aramid strips is between 0.5-2.0 inches wide.

7. The propeller blade assembly of claim 3, wherein the first and second aramid layers are each a continuous sheet arranged to cover at least 60% of a surface area of one side of the respective blade.

8. The propeller blade assembly of claim 1, wherein the core tapers from the first end adjacent the root structure to the second end adjacent the tip of the respective blade.

9. The propeller blade assembly of claim 1, wherein the core comprises a polystyrene foam.

10. The propeller blade assembly of claim 1, wherein the first and second aramid layers are aligned longitudinally along the respective blade with the core and the first and second spar caps.

11. The propeller blade assembly of claim 1, wherein each of the first spar cap and the second spar cap comprises a series of plies arranged in layers of increasing length with an outermost layer being longer than an innermost layer.

12. The propeller blade assembly of claim 11, wherein the series of plies are formed of carbon fabric.

13. The propeller blade assembly of claim 1, wherein each blade is configured to withstand a load of at least 8 kg without permanently deforming.

14. The propeller blade assembly of claim 1, wherein each blade is configured to withstand a dynamic pressure during descent on the order of 250 Pascals.

15. The propeller blade assembly of claim 1, wherein the propeller blade assembly is configured to shed a load of at least 1000 newtons.

16. The propeller blade assembly of claim 1, wherein each blade is configured such that no blade fragment can separate from each blade when impacted by an object having a mass of less than 5 kg at an impact velocity of less than 10 m/s.

17. The propeller blade assembly of claim 1, wherein the propeller blade assembly is configured such that no part thereof separates from the propeller blade assembly upon entanglement with a portion of the lighter-than-air craft at a force of below 5500 newtons.

18. A lighter-than-air craft comprising:

an envelope configured to inflate with lift gas;

a payload attached to the envelope; and a propulsion system configured to provide lateral propulsion to the lighter-than-air craft, the propulsion system including the propeller blade assembly of claim 1.

19. The lighter-than-air craft of claim 18, including a second aramid layer carried on said core between said bottom surface and said second spar cap.

* * * * *